(12) United States Patent
Yoshida

(10) Patent No.: US 7,702,954 B2
(45) Date of Patent: Apr. 20, 2010

(54) DATA STORAGE APPARATUS HAVING ERROR RECOVERY CAPABILITY

(75) Inventor: Osamu Yoshida, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 545 days.

(21) Appl. No.: 11/651,829

(22) Filed: Jan. 9, 2007

(65) Prior Publication Data

US 2008/0126848 A1 May 29, 2008

(30) Foreign Application Priority Data

Sep. 22, 2006 (JP) ............................. 2006-256753

(51) Int. Cl.
G06F 11/00 (2006.01)
(52) U.S. Cl. ............................. 714/6; 714/54
(58) Field of Classification Search ............... 714/5, 714/6, 54, 758
See application file for complete search history.

(56) References Cited

U.S. PATENT DOCUMENTS

| | | | | |
|---|---|---|---|---|
| 5,553,231 | A * | 9/1996 | Papenberg et al. | 714/5 |
| 5,764,881 | A * | 6/1998 | Yoshida | 714/8 |
| 5,928,372 | A * | 7/1999 | Yoshida | 714/704 |
| 6,035,432 | A * | 3/2000 | Jeddeloh | 714/763 |
| 6,314,527 | B1 * | 11/2001 | Weber et al. | 714/6 |
| 6,332,204 | B1 * | 12/2001 | Russell | 714/710 |
| 6,567,953 | B1 * | 5/2003 | Pomerantz | 714/805 |
| 6,578,161 | B1 * | 6/2003 | Kohtani et al. | 714/52 |
| 6,636,954 | B2 * | 10/2003 | Maeda | 711/162 |
| 6,928,607 | B2 * | 8/2005 | Loaiza et al. | 714/807 |
| 7,088,535 | B2 * | 8/2006 | Kim et al. | 360/53 |
| 7,315,976 | B2 * | 1/2008 | Holt | 714/769 |
| 2003/0214743 | A1 | 11/2003 | Urata | |
| 2004/0078738 | A1 | 4/2004 | Kim et al. | |
| 2006/0224841 | A1 * | 10/2006 | Terai et al. | 711/154 |

FOREIGN PATENT DOCUMENTS

JP 2003-331403 11/2003
JP 2004-134077 4/2004

* cited by examiner

*Primary Examiner*—Robert Beausoliel
*Assistant Examiner*—Elmira Mehrmanesh
(74) *Attorney, Agent, or Firm*—Greer, Burns & Crain, Ltd

(57) ABSTRACT

A stored data processing apparatus comprises: a calculation section that performs calculation for each bit position using data of all first blocks in a second block that has been specified as an update target on a storage medium and outputs a result of the calculation as calculation data; a write section that writes the calculation data in the third block associated with the update target; and a read section that reads out data from the first block specified as a read target. In the case where it is determined that a plurality of data can be read out from the read target, the read section sets the read target as a duplication block, reads out data from the first blocks other than the duplication block which belong to the second block including the read target so as to set the read out data as determination data, reads out data from the third block corresponding to the read target so as to set the read out data as redundant data, sets one of the plurality of data that can be read out from the duplication block as selection data, and determines whether the selection data is correct data using the determination data, redundant data, and selection data.

13 Claims, 28 Drawing Sheets

FIG. 3

| SEGMENT 0 | LBA 0 | LBA 1 | ... | | LBA m-1 | REDUNDANT 0 |
|---|---|---|---|---|---|---|
| SEGMENT 1 | LBA m | LBA m+1 | ... | | LBA 2m-1 | REDUNDANT 1 |
| SEGMENT 2 | LBA 2m | LBA 2m+1 | ... | | LBA 3m-1 | REDUNDANT 2 |
| ⋮ | | | | | | ⋮ |
| SEGMENT n-1 | | ... | LBA LAST | | | REDUNDANT n-1 |

FIG. 8

| SEGMENT 0 | LBA 0 | LBA 1 | ... | | ... | LBA m-2 | LBA m-1 |
|---|---|---|---|---|---|---|---|
| SEGMENT 1 | LBA m | LBA m+1 | ... | | ... | LBA 2m-2 | LBA 2m-1 |
| ⋮ | | | | | | | ⋮ |
| SEGMENT n-1 | | | | ... | LBA LAST | REDUNDANT 0 | REDUNDANT 1 |
| | REDUNDANT 2 | ... | | | ... | REDUNDANT n-2 | REDUNDANT n-1 |

FIG. 10

| SEGMENT 0 | LBA 0 | LBA m+1 | LBA 2 | LBA m+3 | ... | ... | LBA m-2 | LBA 2m-1 | REDUNDANT 0 |
|---|---|---|---|---|---|---|---|---|---|
| SEGMENT 1 | LBA m | LBA 1 | LBA m+2 | LBA 3 | ... | ... | LBA 2m-2 | LBA m-1 | REDUNDANT 1 |

FIG. 15

| SEGMENT START LBA | PRESENCE/ABSENCE OF REDUNDANT SECTOR DATA | SEGMENT SIZE |
|---|---|---|
| 0x00000000 | PRESENT | 0x0800 |
| 0x00010000 | PRESENT | 0x10000 |
| 0x00200000 | ABSENT | |
| 0xffffffff | ABSENT | |

FIG. 16

| REDUNDANT0 | REDUNDANT 0 VALID FLAG |
|---|---|
| REDUNDANT1 | REDUNDANT 1 VALID FLAG |
| REDUNDANT2 | REDUNDANT 2 VALID FLAG |
| REDUNDANT3 | REDUNDANT 3 VALID FLAG |
| ... | ... |
| ... | ... |
| REDUNDANT n | REDUNDANT n VALID FLAG |

FIG. 30

| ○ | ○ | × | × | ○ | ○ | ○ | ○ | ○ | ○ |

FIG. 31

CHOICE A

| ○ | ○ | A1 | B1 | ○ | ○ | ○ | ○ | ○ | ○ |

CHOICE B

| ○ | ○ | A1 | B2 | ○ | ○ | ○ | ○ | ○ | ○ |

CHOICE C

| ○ | ○ | A2 | B1 | ○ | ○ | ○ | ○ | ○ | ○ |

CHOICE D

| ○ | ○ | A2 | B2 | ○ | ○ | ○ | ○ | ○ | ○ |

DATA STORAGE APPARATUS HAVING ERROR RECOVERY CAPABILITY

BACKGROUND OF THE INVENTION

1. Field of the Invention

The present invention relates to a storage apparatus that performs recovery operations associated with a read error and a stored data processing apparatus and stored data processing program used for the storage apparatus.

2. Description of the Related Art

The recording capacity of an HDD (Hard Disk Drive) has been increasing, and hard disks of 200 G bytes or more are now available. Along with the increase in recording capacity, the degree of damage becomes severe in the case where a read error occurs in one given sector. In particular, in the case where a read error occurs in one given sector corresponding to a location where directory information concerning to data management in an HDD has been recorded, enormous numbers of data may be damaged. The seriousness of the damage increases as the recording amount increases.

As a means for avoiding troubles specific to such an HDD, a system in which one HDD is configured as part of an array has been available. In this system, if there exists any drive that has got a read error, another HDD provided for increasing redundancy is used to recover the drive data. In order to enhance the resistance of a single HDD against such an error, a method that adds an ECC (Error Correcting Code) to the information in the sector has been adopted. Each sector on a disk medium is composed of SB (syncbyte), DATA, and ECC.

Assume that a read error occurs in a given sector. At this time, a data buffer in an HDD retains data received from a sector at which readout operation is started to a sector which is one sector before a sector where the read error has occurred. If the data readout operation from the sector at which the read error has occurred does not succeed even when retry is attempted, the HDD cannot load effective data into the data buffer and therefore cannot send the effective data to a higher-level device. When the data recovery fails eventually, the HDD notifies the higher-level device of a read error and ends the readout operation.

As a prior art relating to the present invention, there is known a file control apparatus (refer to e.g., Patent Document 1: Jpn. Pat. Appln. Laid-Open Publication No. 5-35416) that prepares a buffer corresponding to the size of data of each the track and performs data check processing in units of tracks. Further, there is known a data recording method (refer to e.g., Patent Document 2: Jpn. Pat. Appln. Laid-Open Publication No. 8-124318) that adds a parity forming LCD (Long Distance Code) to each sector, adds parity sector data to each predetermined number of sectors, calculates parity sector data for each predetermined number of sectors, and uses the parity sector data to make correction when correction using the parity forming the LDC is disabled at reproduction time.

Although the error correction capability itself using the ECC gradually increases, a new data correction method has not been adopted and conventional techniques have continued to be used in recent years. However, in a state where the recording capacity of a single HDD has been increasing, it can be said that the risk of data loss relatively increases with the conventional data error correction capability using the ECC.

Further, as described above, the mechanism in which, in the case where error correction cannot be made using the ECC, the conventional HDD notifies the higher-level device of a read error and ends the readout operation remains basically unchanged since the birth of a disk drive.

Further, in the technique like Patent Document 1, data corresponding to one track needs to be read out every time one writing processing is performed, thus doubling command processing time to deteriorate the performance. As a result, the use of this technique is not realistic. Further, in the technique like Patent Document 2, redundant data needs to be prepared when write data is received from the higher-level device to thereby deteriorate the performance, making it difficult to use this technique practically.

SUMMARY OF THE INVENTION

The present invention has been made to solve the above problems, and an object thereof is to provide a storage apparatus capable of enhancing error recovery capability and a stored data processing apparatus and stored data processing program used for the storage apparatus.

To solve the above problems, according to a first aspect of the present invention, there is provided a stored data processing apparatus for use in a storage apparatus that performs at least write processing for a storage medium on which data is allocated in units of a first block having a predetermined data length, the first block is allocated in units of a second block constituted by a plurality of the first blocks, and a third block having the same data length as the first block is allocated in correspondence with the second block, comprising: a calculation section that performs calculation for each bit position using data of all the first blocks in the second block that has been specified as an update target and outputs a result of the calculation as calculation data; a write section that writes the calculation data output from the calculation section in the third block associated with the update target; and a read section that reads out data from the first block specified as a read target and, in the case where it is determined that a plurality of data can be read out from the read target, sets the read target as a duplication block, reads out data from the first blocks other than the duplication block which belong to the second block including the read target so as to set the read out data as determination data, reads out data from the third block corresponding to the read target so as to set the read out data as redundant data, sets one of the plurality of data that can be read out from the duplication block as selection data, and determines whether the selection data is correct data using the determination data, redundant data, and selection data.

In the stored data processing apparatus according to the present invention, the calculation section initializes the calculation data, sequentially sets the respective first blocks in the update target as input data of the calculation, performs calculation for each bit position using the input data and calculation data, stores a result of the calculation as new calculation data, and repeats the calculation and storage for all the input data to output the calculation data.

In the stored data processing apparatus according to the present invention, the calculation section further performs calculation for each bit position using the determination data, redundant data, and selection data and sets a result of the calculation as calculation data, and in the case where the calculation data is a predetermined value, the read section determines that the selection data is correct data.

In the stored data processing apparatus according to the present invention, the calculation section initializes the calculation data, sequentially sets the respective determination data, redundant data, and selection data as input data of the calculation, performs calculation for each bit position using the input data and calculation data, stores a result of the calculation as new calculation data, and repeats the calculation and storage for all the input data to output the calculation data.

In the stored data processing apparatus according to the present invention, the read section further reads out data from the first block specified as a read target and, in the case where the data read from the first block has failed, sets the first block as an error block, reads out normal data which are all the data in the first block other than the error block which belong to the second block including the read target, and reads out redundant data in the third block corresponding to the second block.

In the stored data processing apparatus according to the present invention, the calculation section further initializes the calculation data, sequentially sets the respective normal data and redundant data as input data of the calculation, performs calculation for each bit position using the input data and calculation data, stores a result of the calculation as new calculation data, and repeats the calculation and storage for all the input data to output the calculation data.

In the stored data processing apparatus according to the present invention, the read section sequentially selects one data from a plurality of data which can be read out from the duplication block as the selection data.

In the stored data processing apparatus according to the present invention, when receiving a data write instruction from an external device and in the case where a write target specified by the data write instruction is a certain entire second block, the calculation section sets the write target as an update target, performs calculation for each bit position using all data of the first block in the update target included in the data write instruction, and outputs a result of the calculation as calculation data.

In the stored data processing apparatus according to the present invention, when receiving a data write instruction from an external device and in the case where the a write target specified by the data write instruction is a part of a certain second block, the calculation section sets the write target as an update target after data write based on the data write instruction, reads out all data of the first block in the update target, performs calculation for each bit position using all first blocks in the update target, and outputs a result of the calculation as calculation data.

In the stored data processing apparatus according to the present invention, the read section performs read operation of a read target by adding a first offset which is a predetermined offset value to the position of a head and, in the case where the read operation has succeeded and the first offset amount is greater than a predetermined offset amount threshold value, performs read operation by adding a second offset which is an offset in the opposite direction to the first offset.

In the stored data processing apparatus according to the present invention, in the case where the read operation performed by adding the second offset has succeeded, it is determined that a plurality of data can be read out from the read target.

In the stored data processing apparatus according to the present invention, when receiving a data read instruction from an external device, the read section specifies a target of the data read instruction as the read target and, in the case where it is determined that the selection data is correct data, outputs the normal data and selection data to the external device.

In the stored data processing apparatus according to the present invention, in the case where it is determined that the selection data is correct data, the read section further performs write operation of the selection data in the read target.

In the stored data processing apparatus according to the present invention, in the case where it is determined that the selection data is correct data, the read section further performs reassignment processing for the read target.

In the stored data processing apparatus according to the present invention, the calculation performed by the calculation section is a calculation in which the same calculation result can be obtained even if the order of the calculation is changed.

In the stored data processing apparatus according to the present invention, the calculation performed by the calculation section is exclusive OR.

In the stored data processing apparatus according to the present invention, the first block is at least one sector, the third block has the same data length as the first block, and the calculation data has the same data length as the first block.

According to a second aspect of the present invention, there is provided a stored data processing program allowing a computer to execute stored data processing in a storage apparatus, comprising: a calculation step that performs calculation for each bit position using data of all the first blocks in the second block that has been specified as an update target and outputs a result of the calculation as calculation data in a storage medium on which data is allocated in units of a first block having a predetermined data length, the first block is allocated in units of a second block constituted by a plurality of the first blocks, and a third block having the same data length as the first block is allocated in correspondence with the second block; a write step that writes the calculation data output from the calculation step in the third block associated with the update target; and a read step that reads out data from the first block specified as a read target and, in the case where it is determined that a plurality of data can be read out from the read target, sets the read target as a duplication block, reads out data from the first blocks other than the duplication block which belong to the second block including the read target so as to set the read out data as determination data, reads out data from the third block corresponding to the read target so as to set the read out data as redundant data, sets one of the plurality of data that can be read out from the duplication block as selection data, and determines whether the selection data is correct data using the determination data, redundant data, and selection data.

According to a third aspect of the present invention, there is provided a storage apparatus that performs at least write processing for a storage medium on which data is allocated in units of a first block having a predetermined data length, the first block is allocated in units of a second block constituted by a plurality of the first blocks, and a third block having the same data length as the first block is allocated in correspondence with the second block, comprising: a calculation section that performs calculation for each bit position using data of all the first blocks in the second block that has been specified as an update target and outputs a result of the calculation as calculation data; a write section that writes the calculation data output from the calculation section in the third block associated with the update target; and a read section that reads out data from the first block specified as a read target and, in the case where it is determined that a plurality of data can be read out from the read target, sets the read target as a duplication block, reads out data from the first blocks other than the duplication block which belong to the second block including the read target so as to set the read out data as determination data, reads out data from the third block corresponding to the read target so as to set the read out data as redundant data, sets one of the plurality of data that can be read out from the duplication block as selection data, and determines whether the selection data is correct data using the determination data, redundant data, and selection data.

According to a third aspect of the present invention, there is provided a storage apparatus that performs at least write processing for a storage medium on which data is allocated in units of a first block having a predetermined data length, the first block is allocated in units of a second block constituted by a plurality of the first blocks, and a third block having the same data length as the first block is allocated in correspondence with the second block, comprising: a calculation section that performs calculation for each bit position using data of all the first blocks in the second block that has been specified as an update target and outputs a result of the calculation as calculation data; and a write section that writes the calculation data output from the calculation section in the third block associated with the update target.

BRIEF DESCRIPTION OF THE DRAWINGS

FIG. 3 is an allocation diagram showing an example of sector allocation in the user area on the disk medium according to the first embodiment;

FIG. 8 is an allocation diagram showing an example of sector allocation in the user area on the disk medium according to a second embodiment;

FIG. 10 is an allocation diagram showing an example of sector allocation in the user area on the disk medium according to a third embodiment;

FIG. 15 is a table showing an example of segment information according to the seventh embodiment;

FIG. 16 is a table showing an example of the data structure of a redundant sector data table according to an eighth embodiment;

FIG. 30 is data showing an example of a result of the user data readout operation in the data selection processing according to the tenth embodiment; and FIG. 31 is data showing an example of user data choice in the data selection processing according to the tenth embodiment.

DETAILED DESCRIPTION OF THE PREFERRED EMBODIMENTS

Embodiments of the present invention will be described below with reference to the accompanying drawings.

First Embodiment

A first embodiment shows an example in which a stored data processing apparatus and a storage apparatus according to the present invention have been applied to an HDD (Hard Disk Drive).

A configuration of the HDD according to the present embodiment will first be described.

Figure 1:
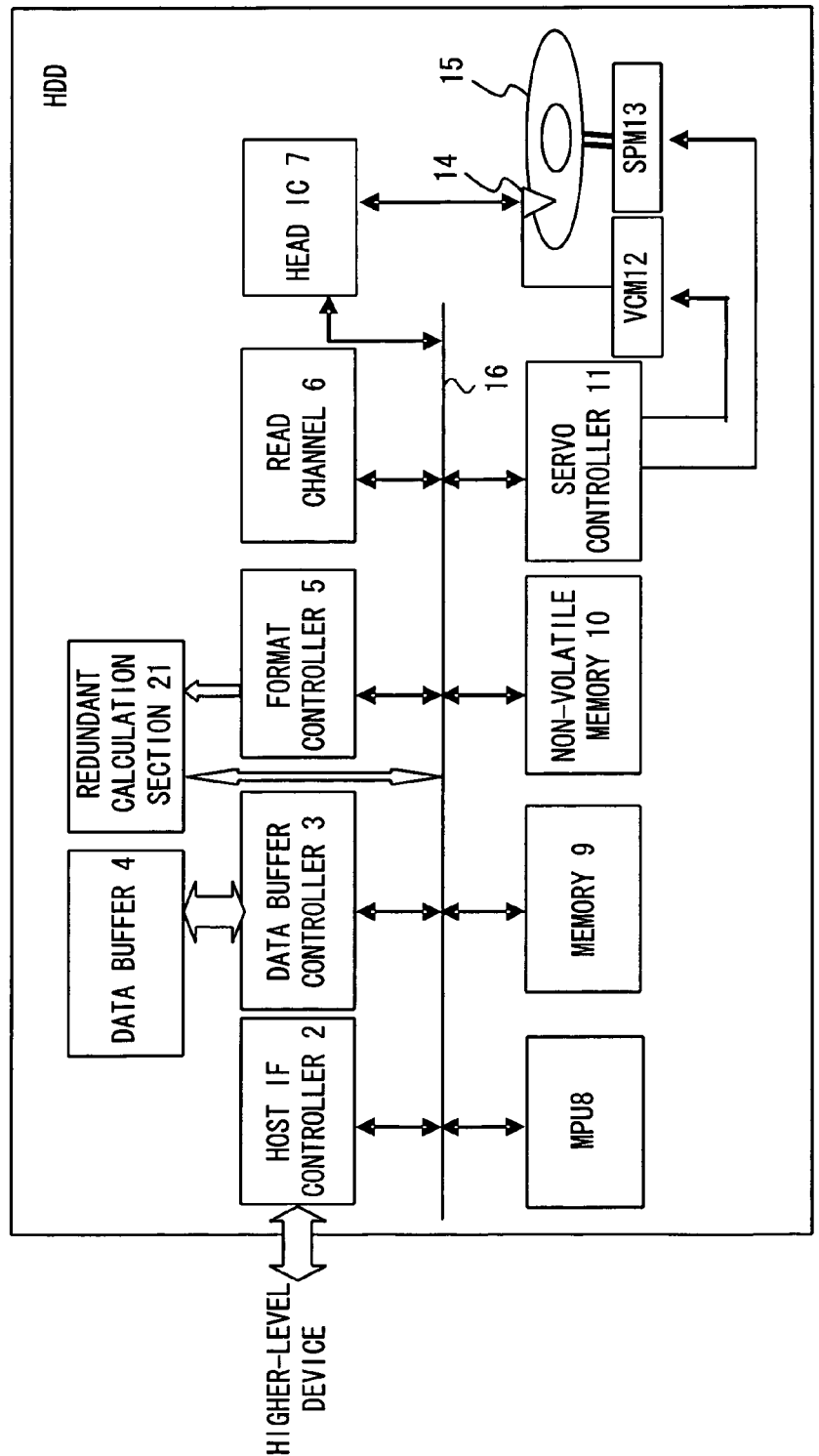
FIG. 1 is a block diagram showing an example of a configuration of an HDD according to a first embodiment.

FIG. 1 is a block diagram showing an example of a configuration of the HDD according to the present embodiment.

A conventional HDD will next be described. This HDD includes a host IF (Interface) controller 2 that controls a host IF for connection to an external device, a data buffer controller 3, a data buffer 4, a format controller 5, a read channel 6, a head IC (Integrated Circuit) 7, an MPU (Micro Processing Unit) for control of the HDD, a memory 9 that stores control data and a control program, a non-volatile memory (FROM) 10 that stores the control program, a servo controller 11 that controls the operation of a spindle motor (SPM) or voice coil motor (VCM), a VCM 12 that actually moves a head actuator, a SPM 13 that rotates a disk, a head 14 for Read/Write, a disk medium 15, an internal common bus 16, and a redundant calculation section 21.

The HDD is connected to a higher-level device (external device) such as a PC (Personal Computer) via the host IF connected to the host IF controller 2. The host IF controller 2, data buffer controller 3, format controller 5, read channel 6, head IC 7, MPU 8, memory 9, non-volatile memory 10, and servo controller 11 are connected with one another via the common bus 16.

In data reading operation from the HDD to the higher-level device, data is read out form the disk medium 15 according to a data read instruction from the higher-level device and is sent to the read channel 6 through the head 14 and head IC 7. The data is further sent to the format controller 5, where ECC calculation is performed. Only the data in which no error has detected is temporarily stored in the data buffer 4 through the data buffer controller 3. Then, the data is sent to the higher-level device through the data buffer controller 3 and host IF controller 2.

In data writing operation from the higher-level device to the HDD, data sent from the higher-level device as a write command is sent via the host IF controller 2 and data buffer controller 3 to the data buffer 4, where the data is temporarily loaded thereinto. Further, at a timing appropriate for execution of the data writing, the data is sent via the data buffer controller 3, format controller 5, read channel 6, and head IC 7 to the disk medium 15, where the data is written thereon.

Figure 2:
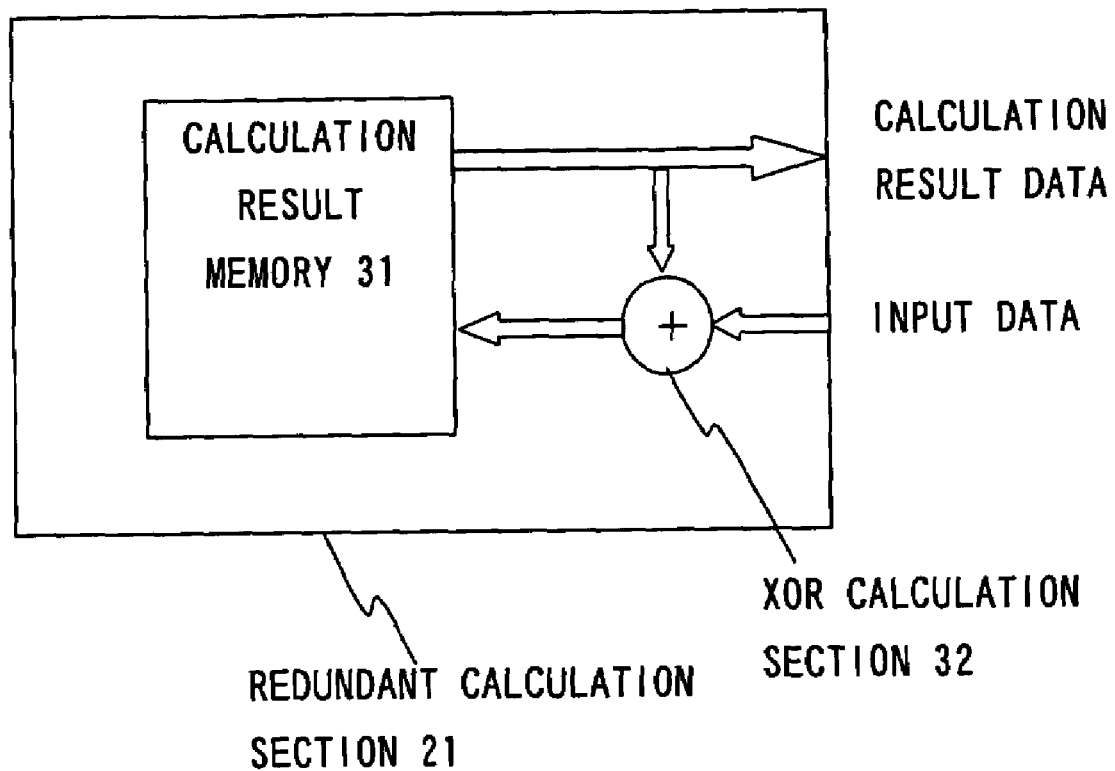
FIG. 2 is a block diagram showing an example of a configuration of a redundant calculation section according to the first embodiment.

FIG. 2 is a block diagram showing an example of a configuration of the redundant calculation section according to the present embodiment. The redundant calculation section 21 includes a calculation result memory 31 and an XOR (Exclusive OR) calculation section 32. The calculation result memory 31 has a capacity corresponding to a single sector size and retains calculation result data (calculation data) corresponding to one sector. Input data corresponding to one sector from an external device and calculation result data corresponding to one sector retained by the calculation result memory 31 are XORed for each bit position by the XOR calculation section 32. The result of the XOR calculation is retained by the calculation result memory 31 as a new calculation result data. The MPU 8 can read out the calculation result data retained by the calculation result memory 31 via the common bus 16 to set the calculation result as redundant sector data.

Sector allocation in the user area on the disk medium 15 will next be described.

FIG. 3 is an allocation diagram showing an example of sector allocation in the user area on the disk medium according to the present embodiment. This diagram shows the allocation of normal sectors into which normal user data are written and redundant sectors into which redundant sector data are written. One element in this diagram represents one sector. Further, in this diagram, a segment is represented by a segment number, a normal sector is represented by an LBA (Logical Block Address), and a redundant sector is represented by a corresponding segment number. Here, normal sectors having m consecutive LBAs are defined as one segment, and the one segment is represented by one row. The entire user area is divided into n segments. One redundant sector into which redundant sector data generated from the user data of one segment are written is inserted from each segment. That is, one redundant sector data (j) is created for the user data having j-th segment LBA (ji) to LBA ((j+1)i−1) for insertion (i=0, 1, . . . m−1) (j=0, 1, . . . n−1).

Operation of the HDD according to the present embodiment will next be described.

Redundant sector data update processing that creates redundant sector data from the user data on the disk medium 15 and performs writing of the created redundant sector data will first be described.

Figure 4:
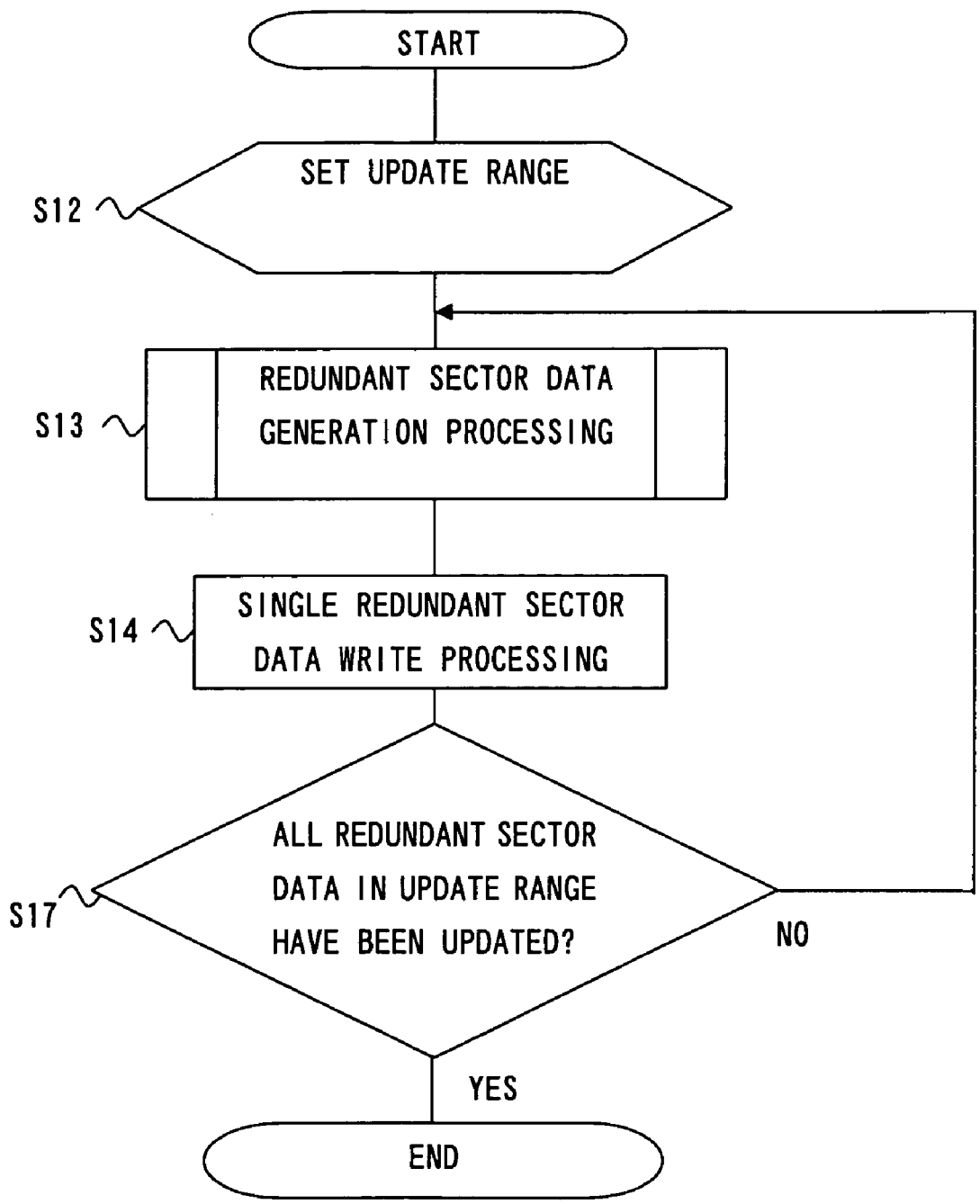
FIG. 4 is a flowchart showing an example of operation of redundant sector data update processing according to the first embodiment.

The redundant sector data update processing is executed when an update instruction is received from the higher-level device or when the time period during which no access has been made from the higher-level device (spare time of the MPU 8) exceeds a threshold value. FIG. 4 is a flowchart showing an example of operation of the redundant sector data update processing according to the present embodiment. The MPU 8 sets the entire user area as an update range (S12). The MPU 8 then performs redundant sector data generation processing for each segment in the set update range (S13) and single redundant sector data write processing to write generated one redundant data onto the disk medium 15 (S14). Subsequently, the MPU 8 determines whether the redundant sector data of all segments in the update range have been updated. If all the redundant sector data have not been updated (N in S17), the MPU 8 returns to step S13, while if all the redundant sector data have been updated (Y in S17), the MPU 8 ends this flow.

Redundant sector data generation processing of step S13 will next be described.

Figure 5:
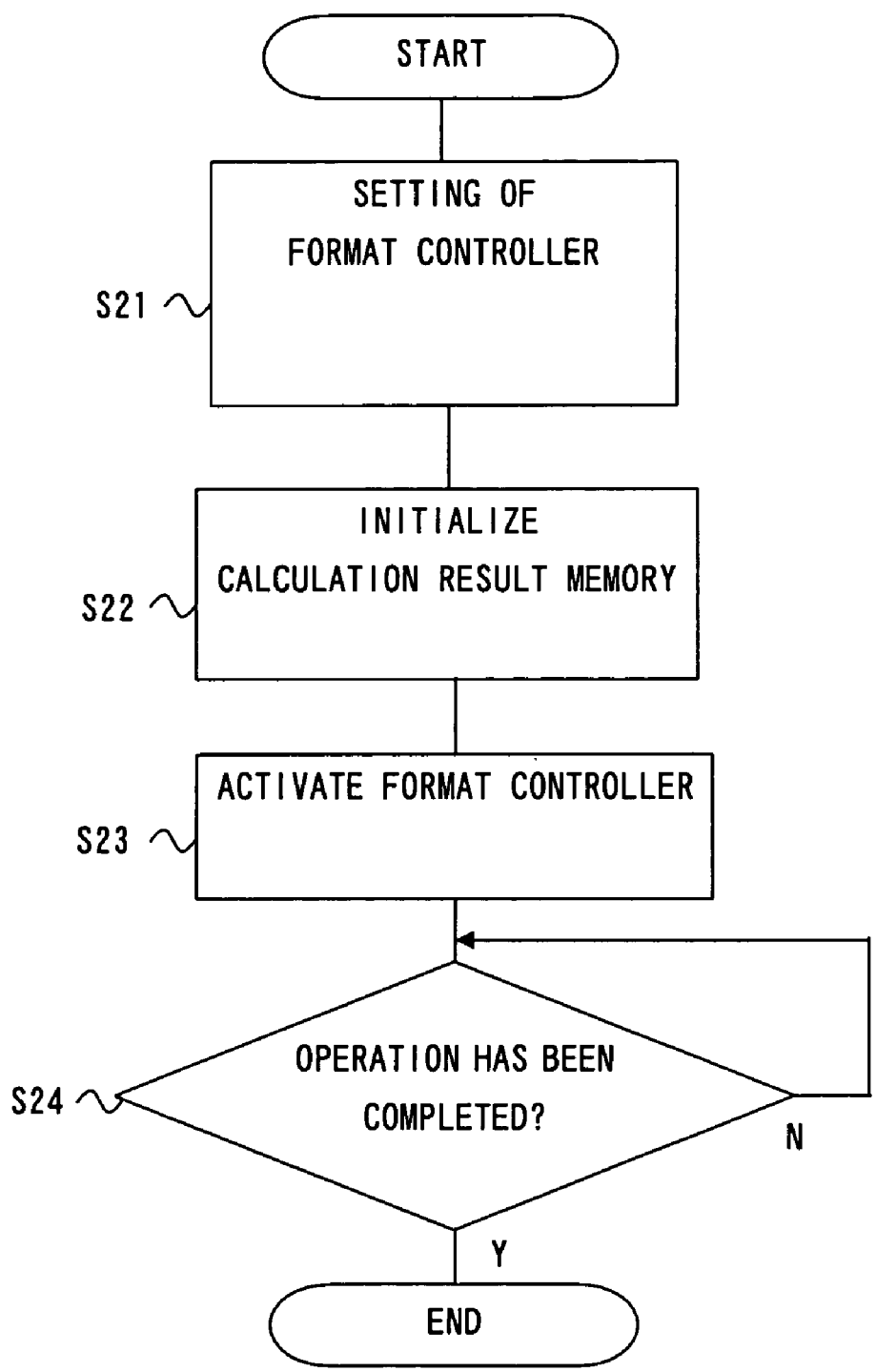
FIG. 5 is a flowchart showing an example of operation of redundant sector data generation processing according to the first embodiment.

The redundant sector data generation processing is processing that reads out user data of a target segment and generates redundant sector data from the read out user data by the redundant calculation section 21. FIG. 5 is a flowchart showing an example of operation of the redundant sector data generation processing according to the present embodiment. The MPU 8 sets the first and last LBAs of a target segment, number of sectors to be processed, and sector allocation are set in the format controller 5 (S21). The sector allocation represents the allocation of the normal sectors used for generation of the redundant sector data and specifies the order of the normal sector to be read out. In the present embodiment, the normal sectors of a target segment are allocated consecutively as described above, and the MPU 8 specifies the sector allocation so as to read out the consecutively allocated normal sectors. Then, the MPU 8 initializes (zero-clears) the calculation result memory 31 of the redundant calculation section 21 (S22). Then, the MPU 8 activates the format controller 5 to allow the format controller 5 to read out target user data and to input the read out user data to the redundant calculation section 21 (S23). After that, the MPU 8 determines whether the operation has been completed. If the operation has not been completed (N in S24), the MPU 8 returns to step S24, while if the operation has been completed (Y in S24), the MPU 8 ends this flow.

Operation of the redundant calculation section 21 during the redundant sector data generation processing will next be described. The data corresponding to one sector retained in the calculation result memory 31 are all initialized to zero, so that the input data which is the first user data are retained without change as the calculation result data in the calculation result memory 31. Subsequent user data and calculation result data are XORed for each bit position and overwritten as the calculation result data in the calculation result memory 31. At the time point at which the redundant sector data generation processing has been completed, the calculation result data retained in the calculation result memory 31 become the redundant sector data.

The last segment which is a segment including the last LBA may have a smaller number of normal sectors than that in the other segments in some cases. However, if only all the user data in the segment are input as input data in the redundant sector data generation processing, the redundant sector data can be obtained, irrespective of the number of the normal sectors.

The single redundant sector data write processing will next be described.

Figure 6:
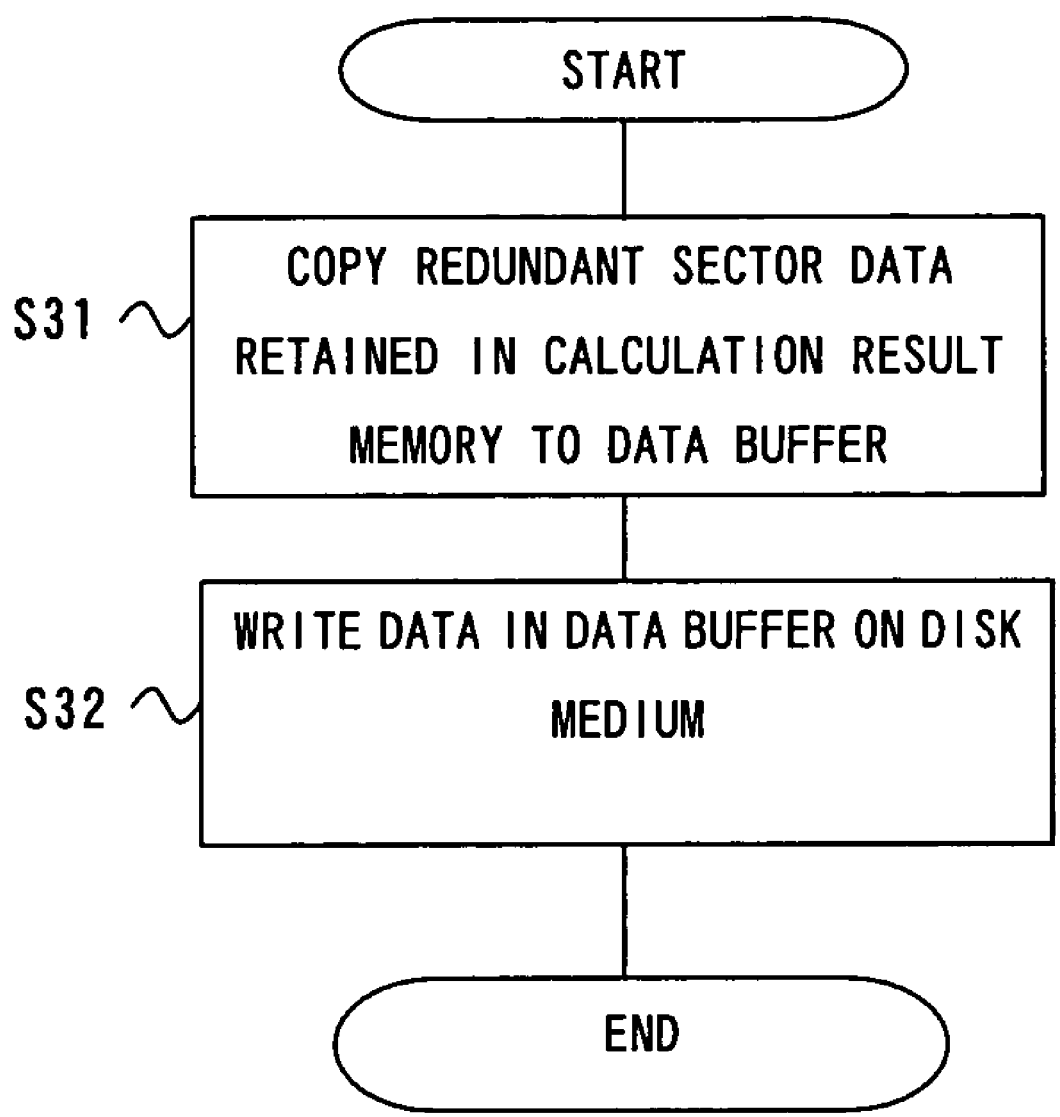
FIG. 6 is a flowchart showing an example of operation of single redundant sector data write processing according to the first embodiment.

FIG. 6 is a flowchart showing an example of operation of the single redundant sector data write processing according to the present embodiment. The MPU 8 copies the redundant sector data retained in the calculation result memory 31 to the data buffer 4 (S31). Then the MPU 8 writes the redundant sector data in the data buffer 4 onto the disk medium 15 (S32)

in the same manner as the processing of writing normal user data in the data buffer 4 onto the disk medium 15 and ends this flow.

In the same manner as writing conventional user data, by using a path for writing user data from the data buffer 4 onto the disk medium 15 as a path for writing the redundant sector data, it is possible to suppress an increase in the hardware scale in the case where the present invention is applied to a conventional HDD. Further, also in update processing of the second redundant sector data, by coping all the redundant sector data temporarily to the data buffer 4, all the redundant sector data can be written onto the disk medium 15 in a consecutive manner.

As described above, it is preferable that the update of the redundant sector data be performed in a timing other than a reception timing of a command (write command or read command) from the higher-level device. A case where an unreadable error sector occurs in an HDD is so rare that it is not necessary to update the redundant sector data at the reception timing of the command from the higher-level device or a timing immediately after the command reception timing. It is because that increased frequency of the redundant sector data update processing increases processing overhead, thereby deteriorating the performance of the HDD.

User data readout processing and disk medium scan processing will next be described.

In the case where the MPU 8 has received a read command from the higher-level device and has normally read out data of all target sectors, the processing concerning the redundant sector data is not required and, in this case, it is only necessary to send the target user data to the higher-level device. On the other hand, if there found any error sector which cannot be recovered in the user data readout processing, error sector data recovery processing that recovers error sector data which is data that have been written in an error sector is performed.

In the case where the MPU 8 receives a disk medium scan command from the higher-level device, the MPU 8 performs disk medium scan processing by reading out data of all sectors in the user area on the disk medium 15 in the same manner as the user data readout processing to detect an error sector. If there found any error sector in the disk medium scan processing, the error sector data recovery processing is performed as in the case of the user data readout processing.

The MPU 8 performs the disk medium scan processing by reading out data of all sectors in the user area on the disk medium 15 in the same manner as the user data readout processing at a predetermined time period. If there found any error sector in the disk medium scan processing, the error sector data recovery processing is performed as in the case of the user data readout processing.

The error sector data recovery process will next be described.

Figure 7:
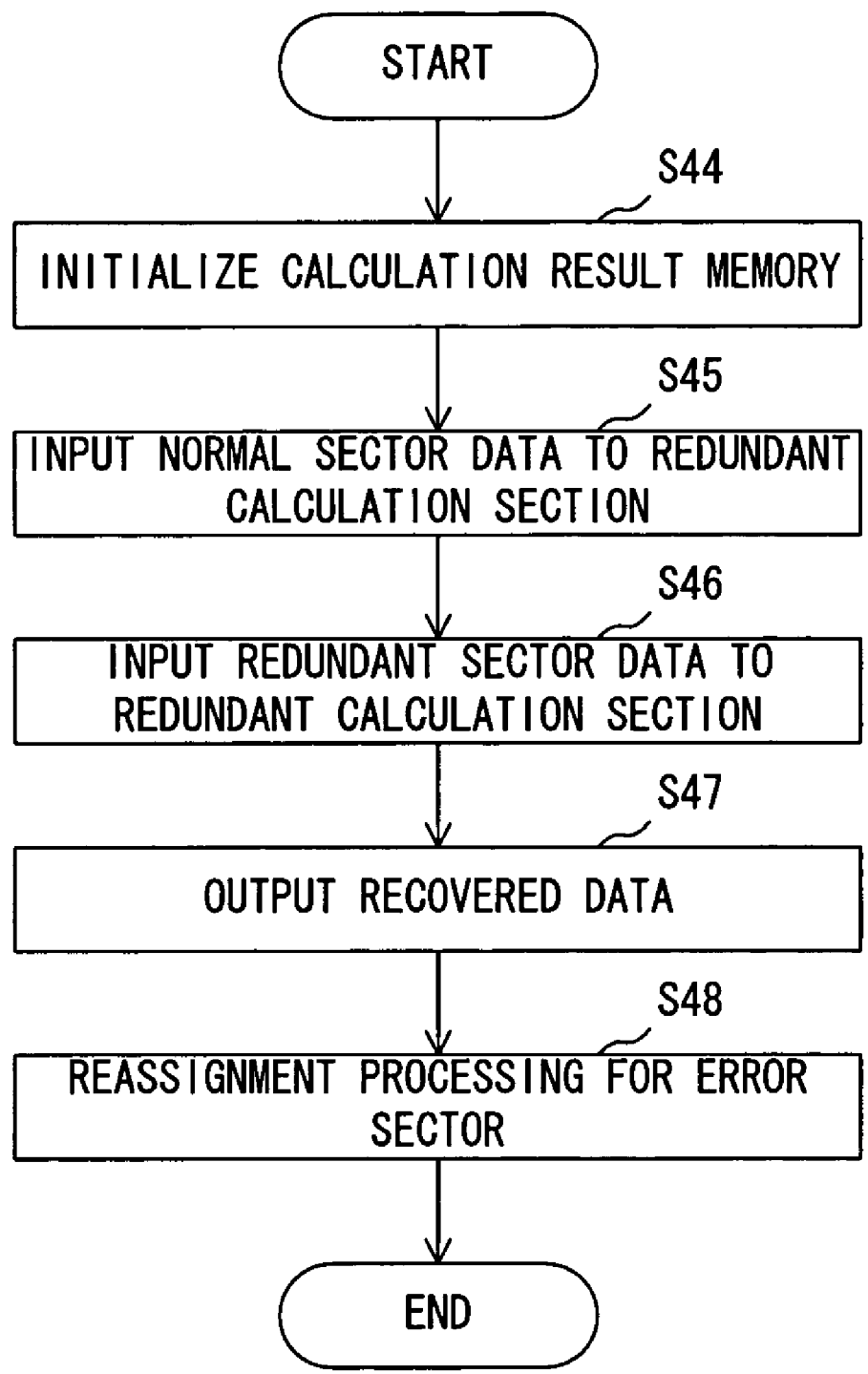
FIG. 7 is a flowchart showing an example of operation of the error sector data recovery processing according to the first embodiment.

FIG. 7 is a flowchart showing an example of operation of the error sector data recovery processing according to the present embodiment. The MPU 8 initializes the calculation result memory 31 (S44), reads out from the disk medium 15 normal sectors in the segment to which the found error sector belongs, and inputs readable user data (user data other than the error sector data) to the redundant calculation section 21 (S45). Then, the MPU 8 reads out from the disk medium 15 the redundant sector data in the segment to which the found error sector belongs and input the readout redundant sector data to the redundant calculation section 21 (S46). At this time, through the operation of the redundant calculation section 21, the calculation result data retained in the calculation result memory 31 becomes recovered data in which the data of the error sector has been recovered. The MPU 8 then reads out the recovered data from the calculation result memory 31 and sends the read out recovered data to the higher-level device (S47). After that, the MPU 8 performs reassignment processing to assign an empty sector to the error sector (S48) and ends this flow.

As described above, by performing XOR calculation for the user data in the target segment other than the error sector data and redundant sector data, error sector data can be recovered. Further, even if the order of the sectors to be input as input data is changed, the same calculation result data can be obtained. Therefore, no matter what sector order the user data of the normal sectors in a given segment are input, the XOR calculation section 32 can obtain redundant sector data as the final calculation result data and, no matter what sector order the user data other than the error sector data and redundant sector data in the segment in which the error sector exists are input, the XOR calculation section 32 can obtain error sector data as the final calculation result data. Further, even with respect to a segment, like the last segment, having a smaller number of normal sectors than that in the other segments, the redundant sector data generation processing and error sector data recovery processing can be performed as in the case of the other segments by using the user data of all normal sectors.

Although the XOR calculation section 32 is used for performing the redundant sector data generation processing and error sector data recovery processing in the present embodiment, other calculations may be employed as far as they are calculation methods in which the same calculation result can be obtained even if the order of a plurality of sectors to be input as input data is changed. Further, although the input data and calculation result data are treated in units of sector, they may be treated in units of other data lengths such as a byte and word.

According to the present embodiment, even if a read error has occurred, error sector data can be recovered. Thus, reliability of a disk drive is remarkably increased. Further, by performing update of the redundant data sector according to an instruction from the higher-level device and spare time of the MPU 8, an increase in response time for the higher-level device can be suppressed.

Second Embodiment

In a second embodiment of the present invention, an HDD capable of collectively writing a plurality of redundant sector data will be described.

The HDD according to the present embodiment has the same configuration as that of the HDD according to the first embodiment.

The sector allocation in the user area on the disk medium 15 will next be described.

FIG. 8 is an allocation diagram showing an example of sector allocation in the user area on the disk medium according to the present embodiment. In this case, all redundant sectors are consecutively allocated, following after all normal sectors shown in the first embodiment.

Operation of the HDD according to the present embodiment will next be described.

Figure 9:
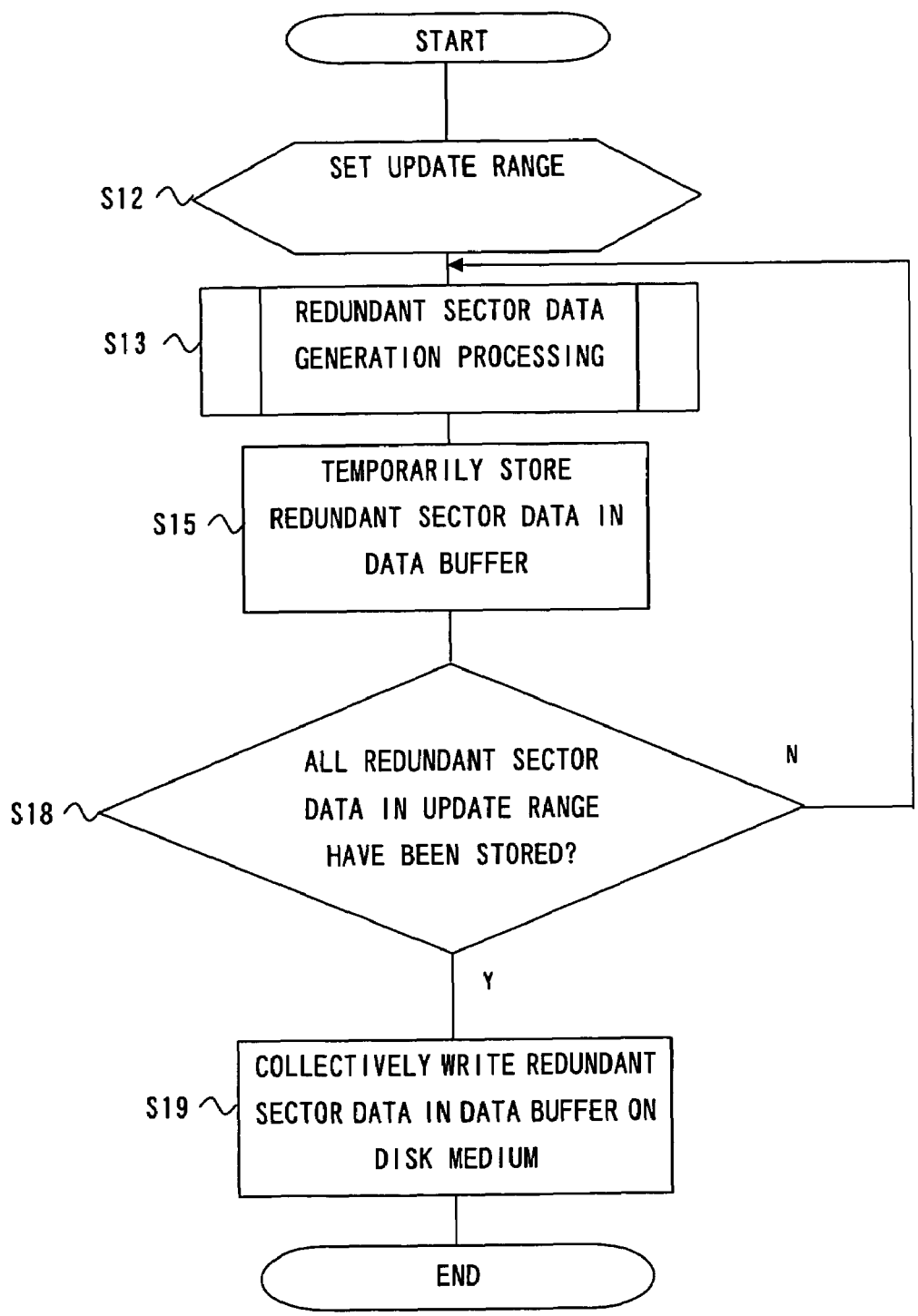
FIG. 9 is a flowchart showing an example of operation of the redundant sector data update processing according to the second embodiment.

A difference in the HDD operation between the first and second embodiments lies in the redundant sector data update processing. FIG. 9 is a flowchart showing an example of operation of the redundant sector data update processing according to the present embodiment. In FIG. 9, the same reference numerals denote the same or corresponding parts as in FIG. 4, and the descriptions thereof are omitted here. After step S13, the MPU 8 temporarily stores in the data buffer 4 the redundant sector data retained in the calculation result memory 31 such that respective generated redundant sector data are not overlapped with one another (S15). Then, the MPU 8 determines whether all the redundant sector data in the update range have been stored in the data buffer 4 (S18). If all the redundant sector data in the update range have not yet been stored in the data buffer 4 (N in S18), the MPU 8 returns to step S13, while if all the redundant sector data in the update range have already been stored in the data buffer 4 (Y in S18), the MPU 8 collectively writes all the redundant sector data in the data buffer 4 onto the disk medium 15 (S19) and ends this flow.

According to the present embodiment, a plurality of redundant sector data can be written in a consecutive manner onto the disk medium, thereby reducing the time needed to write the redundant sector data.

Third Embodiment

In a third embodiment of the present invention, an HDD capable of recovering data of the error sector even in the case where two consecutive error sectors exist in one segment will be described.

The HDD according to the present embodiment has the same configuration as that according to the first embodiment.

The sector allocation in the user area on the disk medium 15 will next be described.

FIG. 10 is an allocation diagram showing an example of sector allocation in the user area on the disk medium according to the present embodiment. This diagram shows the allocation of the normal sectors and redundant sectors. Further, in this diagram, a segment is represented by a segment number, a normal sector is represented by an LBA assigned thereto, and a redundant sector is represented by a corresponding segment number. Here, user data having 2m consecutive LBAs are alternately allocated between two segments, and one redundant sector is inserted for each segment.

For example, m normal sectors having even-numbered LBAs (LBA (0), LBA (2), . . . LBA (m−2)) out of normal sectors having m consecutive LBAs (LBA (0) to LBA (m−1)) and odd-numbered LBAs (LBA (m+1), LBA (m+3), . . . LBA (2m−1)) out of the following normal sectors having m consecutive LBAs (LBA (m) to LBA (2m−1)) are alternately allocated. A segment represented as a first raw is defined as segment 0, and a redundant sector 0 which is obtained from the m normal sector in this segment 0 is inserted after the end of the segment 0. Similarly, m normal sectors having even-numbered LBAs (LBA (m), LBA (m+2), . . . LBA (2m−2)) out of normal sectors having m consecutive LBAs (LBA (m) to LBA (2m−1)) and odd-numbered LBAs (LBA (1), LBA (3), . . . LBA (m−1)) out of normal sectors having m consecutive LBAs (LBA (0) to LBA (m−1)) are alternately allocated. A segment represented as a second raw is defined as segment 1, and a redundant sector 1 which is obtained from the m normal sector in this segment 1 is inserted after the end of the segment 1.

That is, in segment 0 of the first row, normal sectors LBA (0), LBA (m+1), LBA (2), LBA (m+3), . . . LBA (m−2), LBA (2m−1), and redundant sector 0 are allocated. In segment 1 of the second row, normal sectors LBA (m), LBA (1), LBA (m+2), LBA (3), . . . LBA (2m−2), LBA (m−1), and redundant sector 1 are allocated.

Operation of the HDD according to the present embodiment will next be described.

The redundant sector data update processing is performed in the same manner as the first embodiment.

The operation of the HDD in the present embodiment differs from that of the first embodiment in the specification of the sector allocation performed in step S22. The MPU 8 specifies, as the sector allocation, the order of the normal sectors that have been alternately allocated between the two segments as described above.

A use of the sector allocation according to the present embodiment enables the redundant sector data generation processing and error sector data recovery processing to be performed in the same manner as the first embodiment and allows required normal sectors to be read out.

According to the present embodiment, in the case where two consecutive error sectors exist in one segment, the error sectors exist one by one in two segments. Thus, by performing the error sector data recovery processing for each segment, the two consecutive error sectors can be recovered.

Fourth Embodiment

In a fourth embodiment of the present invention, an HDD capable of recovering data of the error sector even in the case where two consecutive error sectors exist in one segment and capable of reducing processing time will be described.

The HDD according to the present embodiment has the same configuration as that according to the first embodiment except for the configuration of the redundant calculation section 21. That is, the calculation result memory 31 has a capacity corresponding to two sectors, and XOR calculation section 32 performs XOR calculation for each bit position using externally input data corresponding to two sectors and calculation result data corresponding to two sectors which are retained in the calculation result memory 31.

The sector allocation in the user area on the disk medium 15 will next be described.

The sector allocation in the present embodiment is the same as that in the third embodiment. For example, as shown in FIG. 10, in segment 0 of the first row, normal sectors LBA (0), LBA (m+1), LBA (2), LBA (m+3), . . . LBA (m−2), LBA (2m−1), and redundant sector 0 are allocated. In segment 1 of the second row, normal sectors LBA (m), LBA (1), LBA (m+2), LBA (3), . . . LBA (2m−2), LBA (m−1), and redundant sector 1 are allocated.

In the redundant sector data generation processing and error sector data recovery processing according to the present embodiment, the MPU 8 reads out two sectors at a time according to the sector allocation, and the redundant calculation section 21 performs XOR calculation for two sectors at a time. In this example, specifically, two sectors of LBA (0) and LBA (1) are read out at a time and input to the redundant calculation section 21. Subsequently, two sectors of LBA (2) and LBA (3), . . . two sectors of LBA (m−2) and LBA (m−1) are read out respectively and are then input to the redundant calculation section 21. Eventually, redundant sector data corresponding to two sectors or error sector data corresponding to two sectors are retained in the calculation result memory 31.

According to the present embodiment, in the case where two consecutive error sectors exist in one segment, the error sectors exist one by one in two segments. Thus, by performing the error sector data recovery processing for each segment, the two consecutive error sectors can be recovered. Further, by using the calculation result memory 31 and XOR calculation section 32 that process data corresponding to two sectors, it is possible to reduce the time required for the redundant sector data generation processing or error sector data recovery processing by about ½ of the time required in the third embodiment.

Although the data length of each of the calculation result memory 31 and XOR calculation section 32 corresponds to data of two sectors in the present embodiment, other data lengths may be employed. Further, although normal sectors having consecutive LBAs are alternately allocated between two segments in the present embodiment, the normal sectors having consecutive LBAs may be allocated between two or more segments according to a predetermined rule.

Fifth Embodiment

In a fifth embodiment of the present invention, an HDD capable of reducing the load of the data buffer or MPU will be described.

A configuration of the HDD according to the present embodiment will first be described.

Figure 11:
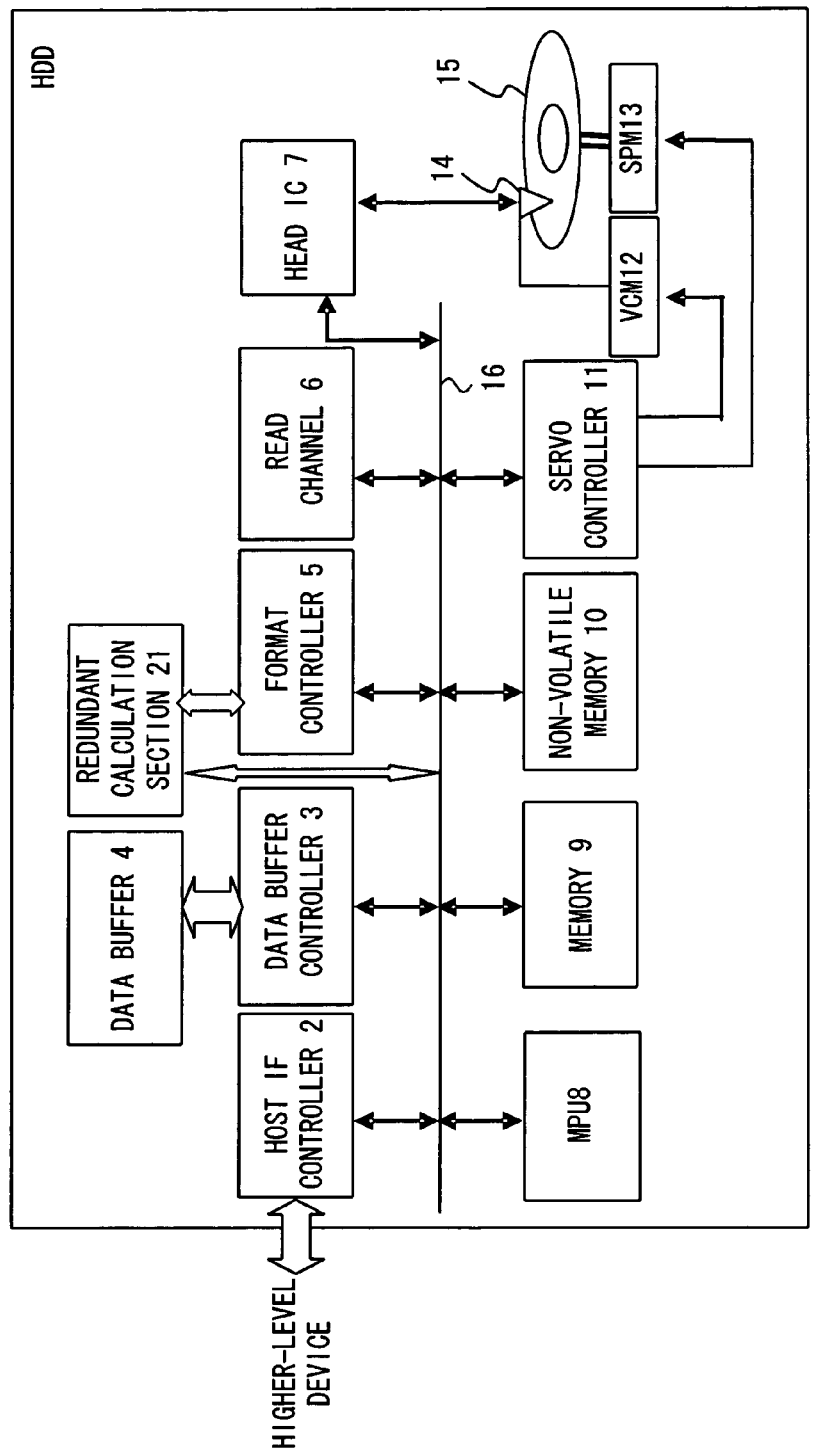
FIG. 11 is a block diagram showing an example of a configuration of an HDD according to a fifth embodiment.

FIG. 11 is a block diagram showing an example of a configuration of the HDD according to the present embodiment. In FIG. 11, the same reference numerals denote the same or corresponding parts as in FIG. 1, and the descriptions thereof are omitted here. A different point from FIG. 1 is that a path from the redundant calculation section 21 to the format controller 5 is newly provided.

Operation of the HDD according to the present embodiment will next be described.

Although the redundant sector data update processing is the same as that of the first embodiment, single sector data write processing differs from that of the first embodiment. Other operations are the same as those of the first embodiment.

Figure 12:
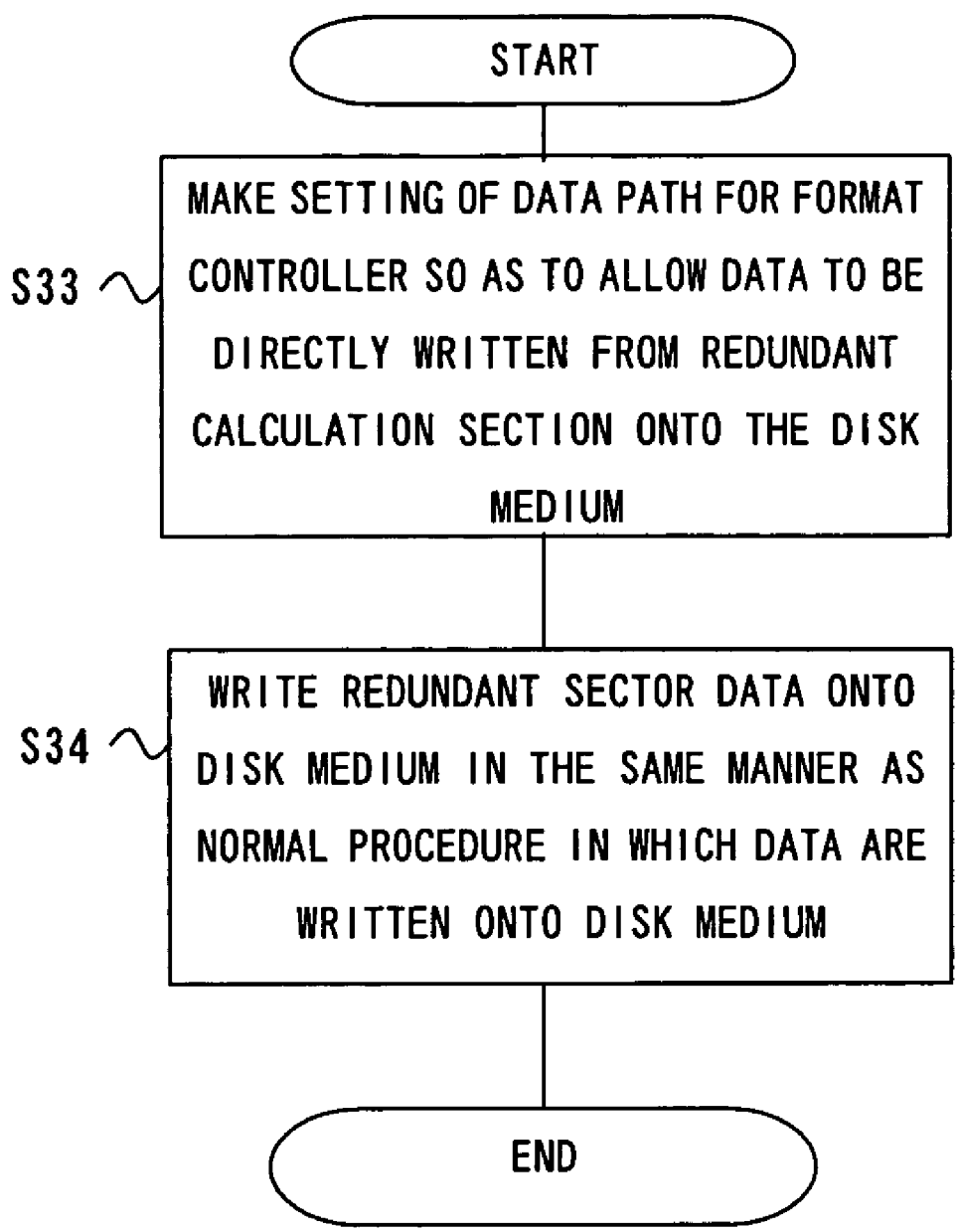
FIG. 12 is a flowchart showing an example of the single redundant sector data write processing according to the fifth embodiment.

FIG. 12 is a flowchart showing an example of the single redundant sector data write processing according to the present embodiment. The MPU 8 makes the setting of a data path for the format controller 5 so as to allow the data of the calculation result memory 31 to be directly written from the redundant calculation section 21 onto the disk medium 15 (S33). Then, the MPU 8 writes the redundant sector data in the calculation result memory 31 onto the disk medium 15 in the same manner as the procedure in which the user data in the data buffer 4 are written onto the disk medium 15 (S34) and ends this flow.

As described above, the redundant sector data retained in the calculation result memory 31 of the redundant calculation section 21 are directly written onto the disk medium 15 via the format controller 5. With this configuration, it is possible to reduce the load of the data buffer 4 or MPU 8 (firmware) as compared to the first embodiment.

Sixth Embodiment

In a sixth embodiment of the present invention, an HDD that adds a redundant sector to a part of the range in the user area will be described.

A set of the normal sectors in the user area to which the redundant sector is to be added is set as a recovery target range, and the normal sectors in the recovery target range are divided into segments. Therefore, only when the normal sectors in the recovery target range includes any error sector, the error sector data recovery processing is performed.

The HDD according to the present embodiment has the same configuration as that according to the first embodiment.

Operation of the HDD according to the present embodiment will next be described.

Recovery target range identification processing which is performed at the power-on time in the case where the recovery target range has been set will first be described.

Figure 13:
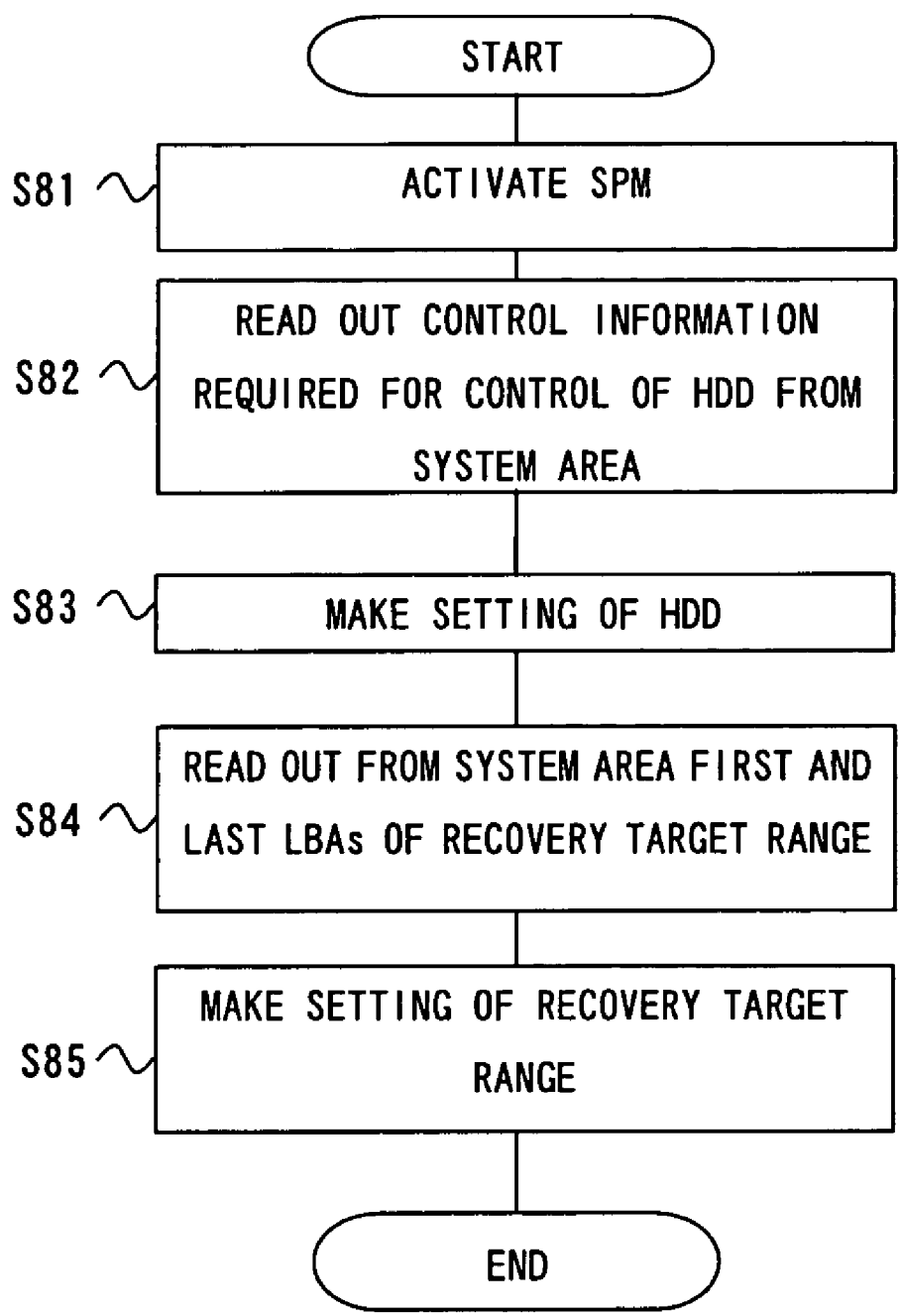
FIG. 13 is a flowchart showing an example of operation of recovery target range identification processing according to a sixth embodiment.

FIG. 13 is a flowchart showing an example of operation of the recovery target range identification processing according to the present embodiment. The MPU 8 activates the SPM 13 (S81). Then the MPU 8 reads out control information required for control of the HDD from the system area of the disk (S82) and makes the setting of the HDD based on the read out control information (S83). Then the MPU 8 reads out from the system area the first and last LBAs of the recovery target range (S84), makes the setting of the recovery target range based on the read out information (S85), and ends this flow.

By making the abovementioned setting of the recovery target range, the update range in the redundant sector data update processing is set in the recovery target range. Other operations are the same as those of the first embodiment.

According to the present embodiment, the redundant sector is added only to the normal sector that needs to be recovered, thereby suppressing the consumption of resources such as the memory 9 in the HDD or system area on the disk medium 15.

Seventh Embodiment

In a seventh embodiment of the present invention, an HDD capable of changing the size of each segment will be described.

A segment size, which is the size of each segment, stays constant in the abovementioned embodiments; while in the present embodiment, the segment size can be changed such that, for example, the segment size is made smaller in a frequently-accessed area while the segment size is made larger in an infrequently-accessed area.

The HDD according to the present embodiment has the same configuration as that according to the first embodiment.

Operation of the HDD according to the present embodiment will next be described.

The recovery target range identification processing which is performed at the power-on time in the case where the recovery target range has been set will be described.

Figure 14:
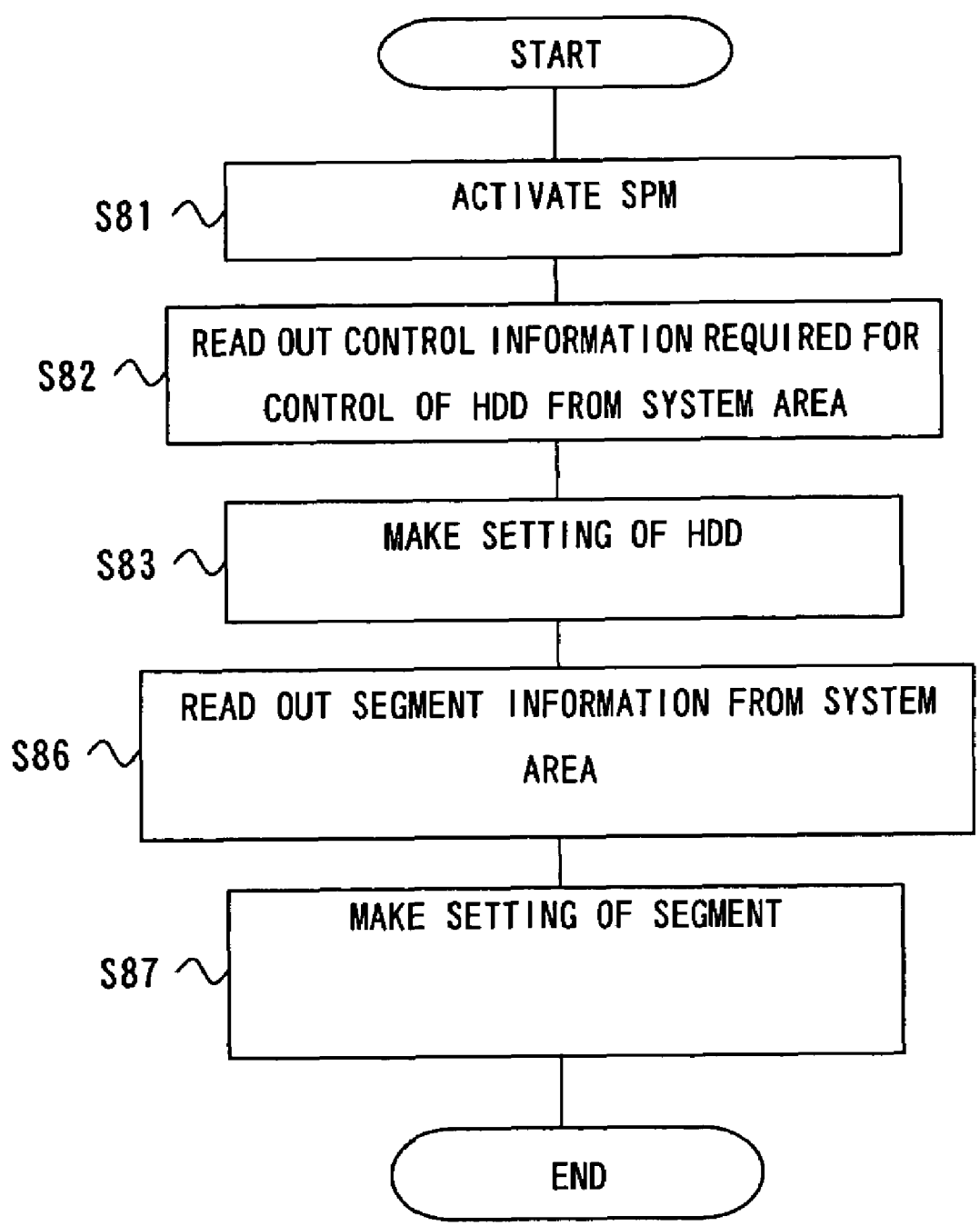
FIG. 14 is a flowchart showing an example of operation of segment size identification processing according to a seventh embodiment.

Segment size identification processing which is performed at the power-on time in the case where the segment size has been set will first be described. FIG. 14 is a flowchart showing an example of operation of the segment size identification processing according to the present embodiment. In this flowchart, processing of steps 81, 82, 83 are the same as those in the sixth embodiment. After the step S83, the MPU 8 reads out, from the system area, segment information including the segment size (S86), makes the setting of the size of each segment and the like based on the read out information (S87), and ends this flow.

The segment information stored in the system area on the disk medium 15 will here be described. FIG. 15 is a table showing an example of the segment information according to the present embodiment. The segment information has, as its items, "segment start LBA", "presence/absence of redundant sector data", and "segment size" for each segment. In this example, the area from LBA (0x00000000) to LBA (0x0000ffff) is assigned to segments each having a segment size of 0x0800 sectors, and redundant sectors are assigned to the respective segments. The area from LBA (0x00010000) to LBA (0x0001ffff) is assigned to segments each having a segment size of 0x10000 sectors, and redundant sectors are assigned to the respective segments. On the other hand, no segment and no redundant sector is assigned to the area from LBA (0x00020000) to the last sector.

By making the abovementioned setting of the recovery target range, the update range in the redundant sector data update processing is set in an area to which the redundant sector data has been assigned. Other operations are the same as those of the first embodiment.

By retaining such segment information in the system area, assignment of the segment or redundant sector can be changed for each use of the HDD or for each user of the HDD. Further, when the ratio of the redundant sector data is made higher in a user area where update is frequent, that is, an area where there is a high possibility of occurrence of the error sector, resources of the HDD can effectively be used and possibility that the data can be recovered is significantly increased, thereby considerably increasing the reliability of the HDD.

Eighth Embodiment

In an eighth embodiment of the present invention, an HDD that has information indicating whether each redundant sector data is valid or not will be described.

The HDD according to the present embodiment has the same configuration as that of the first embodiment.

A redundant sector table indicating whether each redundant sector data is valid or not will next be described.

The redundant sector data table is generated by the MPU 8 and is stored in the non-volatile memory 10. FIG. 16 is a table showing an example of the data structure of the redundant sector data table according to the present embodiment. The redundant sector data table has, as its items, "redundant sector number (segment number)" corresponding to each redundant sector data and "valid flag" indicating whether each redundant sector data is valid or not. The MPU 8 can update only invalid redundant sector data by referring to the redundant sector data table at the data update time, thereby increasing the efficiency of the update processing of the redundant sector data.

It is preferable that the update of the redundant sector data table be performed while the MPU 8 does not receive a command from the higher-level device.

Operation of the HDD according to the present embodiment will next be described.

Although the redundant sector data update processing according to the present embodiment is the same as that according to the first embodiment, only different point is that processing that searches the redundant sector data table for a segment in which the valid flag indicates "invalid" and sets the found segment as an update range is performed in place of step S12 of FIG. 4. Other processing are the same as those of the first embodiment.

Command reception processing performed when the MPU 8 receives a command from the higher-level device will next be described.

Figure 17:
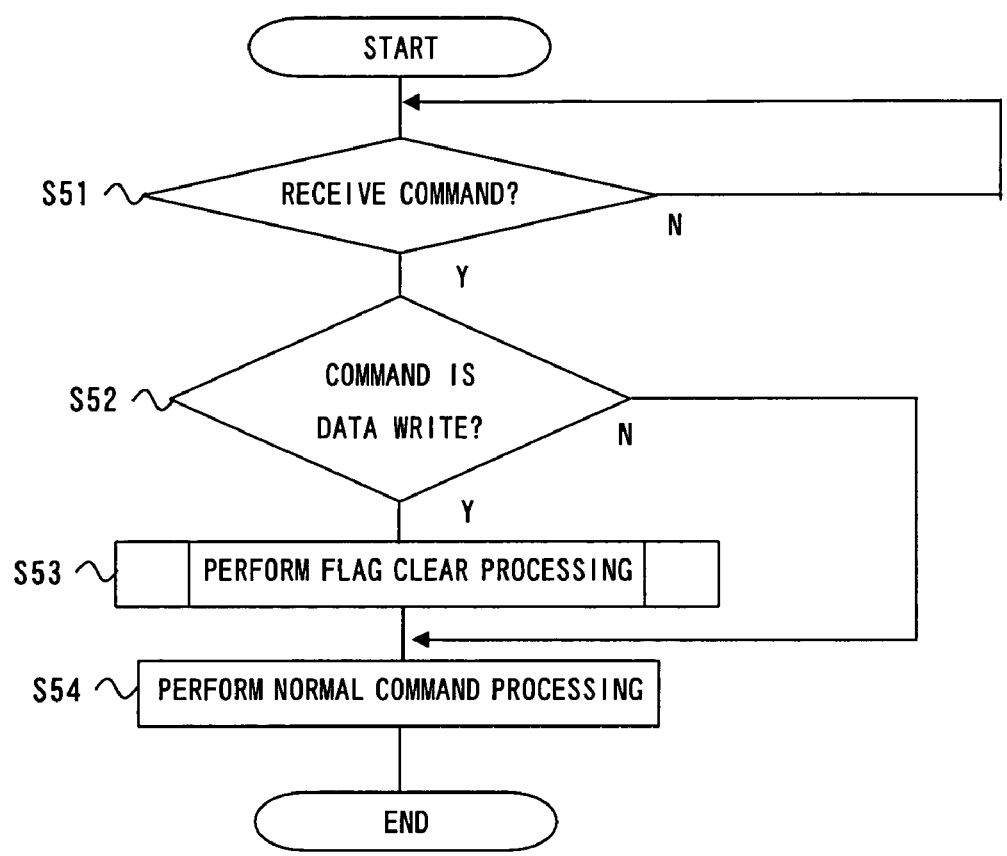
FIG. 17 is a flowchart showing an example of operation of command reception processing according to the eighth embodiment.

FIG. 17 is a flowchart showing an example of operation of the command reception processing according to the present embodiment. The MPU 8 determines whether it has received any command from the higher-level device. If the MPU 8 has not received any command (N in S51), it returns to S51, while the MPU 8 has received any command (Y in S51), it advances to the next step, where the MPU 8 determines whether the received command is a data write command. If the command is not a data write command (N in S52), the MPU 8 advances to S54, while if the command is a data write command (Y in S52), the MPU 8 advances to the next step, where the MPU 8 performs flag clear processing (S53). Then, the MPU 8 performs command processing which is normal processing performed based on the received command (S54) and ends this flow.

The flag clear processing that clears (invalidates) a valid flag will next be described.

Figure 18:
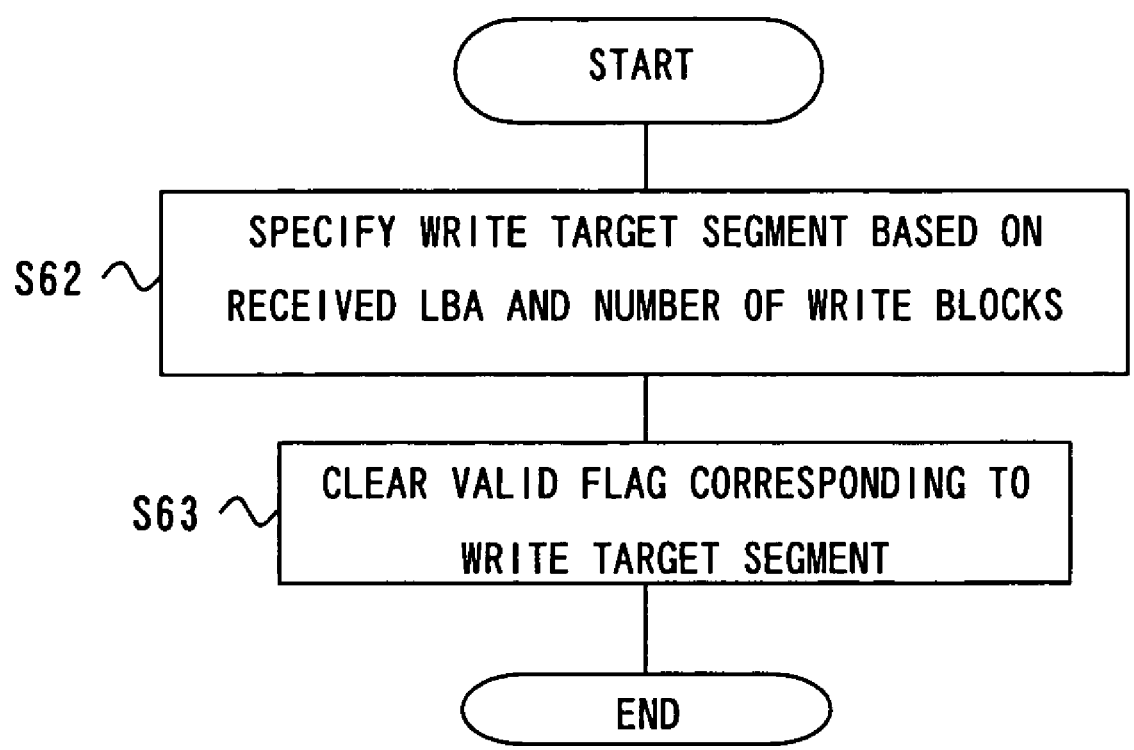
FIG. 18 is a flowchart showing an example of operation of flag clear processing according to the eighth embodiment.

FIG. 18 is a flowchart showing an example of operation of the flag clear processing according to the present embodiment. The MPU 8 specifies a write target segment which is a target of write processing based on received LBA and write size (S62). For example, assuming that the size of all segments is constant, the MPU 8 sets [received LBA/segment size] as the start segment of the write target segment and sets [[received LBA+write size]/segment size] as the end segment thereof. If the segment size is not constant, case analysis is performed using the segment size. Then, the MPU 8 clears the valid flag corresponding to the write target segment (S63) and ends this flow.

Assume that the flag clear processing is performed after the data write processing. In this case, if an unexpected trouble occurs between the write processing time and flag clear processing time to cause the valid flag to remain, improper error sector data recovery processing may be performed. Therefore, in the present embodiment, the flag clear processing is performed before the data write processing.

Flag set processing that sets (validates) the valid flag will next be described.

The MPU 8 performs the flag set processing after the completion of the single redundant sector data write processing. In this processing, the MPU 8 sets in the redundant sector data table a valid flag corresponding to the redundant sector data written through the single redundant sector data write processing.

Assume that the flag set processing is performed before the single redundant sector data write processing. In this case, if only the valid flag is set in a state where the redundant sector data has not been written, improper error sector data recovery processing may be performed.

The error sector data recovery processing according to the present embodiment will next be described.

Figure 19:
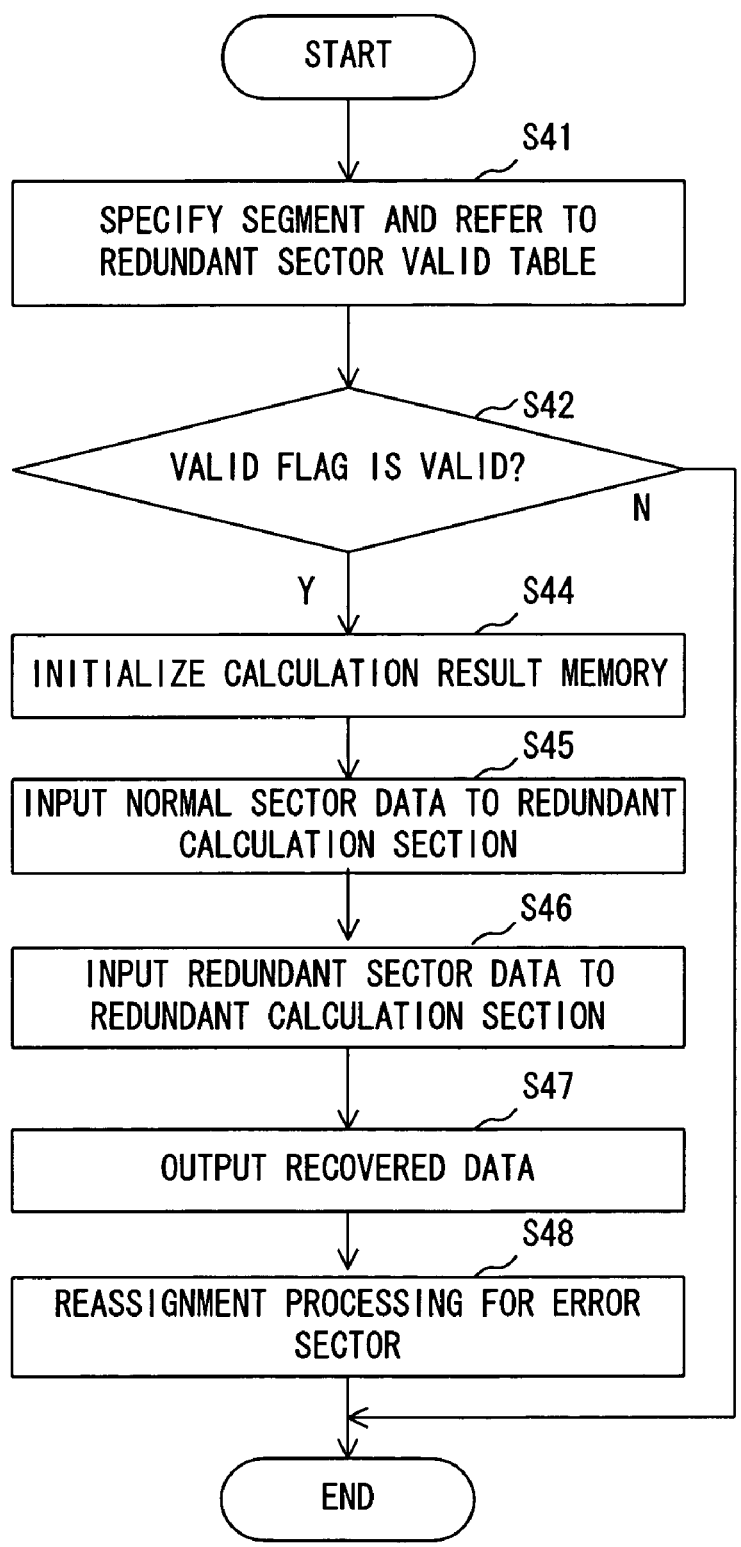
FIG. 19 is a flowchart showing an example of operation of the error sector data recovery processing according to the eighth embodiment.

FIG. 19 is a flowchart showing an example of operation of the error sector data recovery processing according to the present embodiment. The MPU 8 specifies a segment to which an error sector belongs based on the detected LBA of the error sector and acquires the valid flag corresponding to the specified segment by referring to the redundant sector data table (S41). Then, the MPU 8 determines whether the acquired valid flag is valid. If the valid flag is invalid (N in S42), the MPU 8 ends this flow, while if the valid flag is valid (Y in S42), the MPU 8 advances to the next step. The subsequent steps S44, S45, S46, S47, and S48 are the same as those in the error sector data recovery processing of the first embodiment.

If the redundant sector data table disappears after the power-off of the HDD, the error sector data recovery processing cannot be performed in the case where there detected any error sector immediately after the next power-on. Thus, in the present embodiment, the redundant sector data table is stored in the non-volatile memory 10.

The redundant sector data table may be updated and written onto the disk medium 15 at a timing at which the HDD receives a Flush Cache command or a head retreat command from the higher-level device. Since a write cache function is used in HDDs in general, write data from the higher-level device which is retained in the data buffer 4 (cache) is written onto the disk medium 15 before the power-off. The Flush Cache command is used to force the write processing to the disk medium 15 to be performed and is issued from the higher-level device before the power-off of the HDD. At this timing, the MPU 8 performs the update of the redundant sector data table and data write onto the disk medium 15.

According to the present embodiment, it is possible to update only the redundant sector data that needs to be updated, so that the load associated with the update processing of the redundant sector data can be reduced. Therefore, it is possible to quickly complete the update processing of the redundant sector data while preventing the performance of the HDD from being deteriorated. Further, a possibility that the redundant sector data corresponding to the error sector has already been generated in the case where the error sector has been detected can be increased.

While a possibility that the redundant sector data corresponding to the error sector is valid is increased when the size of all segments is reduced, the consumption of resources such as the memory 9 in the HDD or system area on the disk medium 15 is increased. In order to cope with this problem, the size of each segment is made different from one another like the seventh embodiment, thereby increasing the reliability of the HDD while suppressing the resource consumption.

Ninth Embodiment

In a ninth embodiment of the present invention, an HDD that dynamically changes the segment information will be described.

The HDD according to the present embodiment has the same configuration as that according to the first embodiment.

Operation of the HDD according to the present embodiment will next be described.

The redundant sector data update processing, redundant sector data generation processing, single redundant sector data write processing, user data read processing, and disk medium scan processing are the same as those of the first embodiment. As in the case of the eighth embodiment, the redundant sector data table is stored in the non-volatile memory 10. Further, as in the case of the second embodiment, in the sector allocation, all redundant sectors are consecutively allocated in a consecutive manner, following after all normal sectors consecutively allocated. Further, as in the case of seventh embodiment, the segment information is stored in the system area on the disk medium 15.

Segment information change processing that dynamically changes the segment information will next be described.

Figure 20:
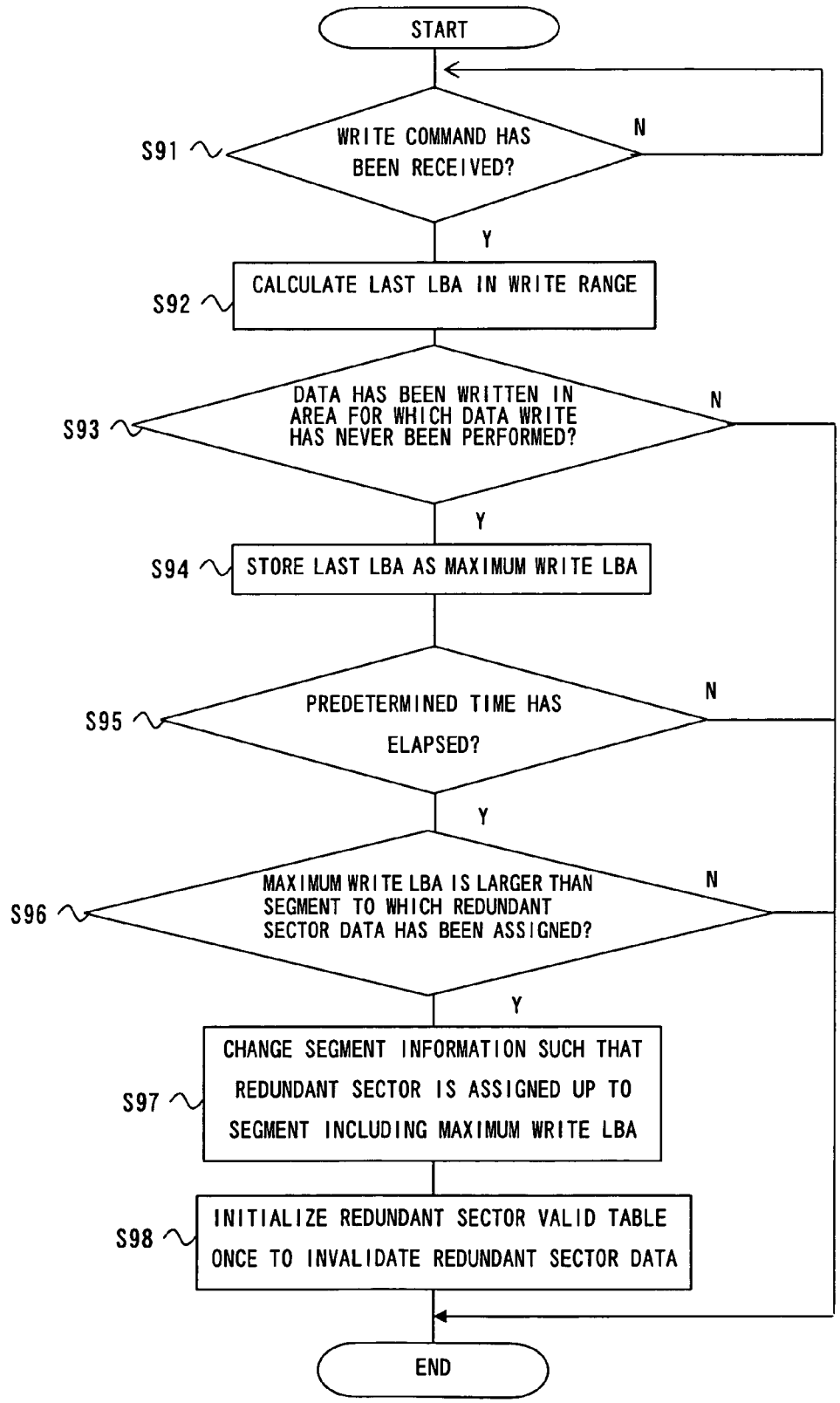
FIG. 20 is a flowchart showing an example of operation of segment information change processing according to a ninth embodiment.

FIG. 20 is a flowchart showing an example of operation of the segment information change processing according to the present embodiment. The MPU 8 determines whether it has received any write command from the higher-level device. If the MPU has not received the write command (N in S91), it returns to S91, while if the MPU 8 has received the write command (Y in S91), it advances to the next step, where the MPU 8 calculates the last LBA in the write range (S92). Then the MPU 8 determines whether the data has been written in an area for which data write has never been performed. If the data has been written in an area other than the area for which data write has never been performed (N in S93), the MPU 8 ends this flow, while if the data has been written in an area for which data write has never been performed (Y in S39), the MPU advances to the next step.

The MPU 8 then stores therein the last LBA in the write range as the maximum write LBA (S94). After that, the MPU 8 determines whether a predetermined time has elapsed. If a predetermined time has not elapsed (N in S95), the MPU ends this flow, while if a predetermined time has elapsed (Y in S95), the MPU 8 advances to the next step, where the MPU 8 determines whether the maximum write LBA is larger than a segment to which the redundant sector has been assigned. If the maximum write LBA is not larger then the segment (N in S96), the MPU 8 ends this flow, while if the maximum write LBA is larger then the segment (Y in S96), the MPU 8 advances to the next step, where the MPU 8 changes the segment information such that the redundant sector is assigned up to the segment including the maximum write LBA (S97). Then the MPU 8 initializes the redundant sector valid table to invalid all redundant sectors once (S98) and ends this flow.

It takes a long time until the entire disk capacity has been used from the start of the use of an HDD. If all segment information have been set at the time of start of use of the HDD, a redundant sector area corresponding to an unused part of the user area is not used for a while. According to the present embodiment, dynamically changing the segment information can reduce the unused part of the redundant sector area. For example, in the case where the segment is formed, including 0x10000 sectors, over the entire user area, the size of the segment is reduced to 0x08000 in a state where only less than half of the entire user area is used. By doing this, it is possible to effectively use the redundant sector area.

Tenth Embodiment

In a tenth embodiment of the present invention, an HDD that outputs correct data in the case where two data can be read out from one sector will be described.

A case where two data can be read out from one sector will first be described with respect to a conventional HDD.

A situation can be assumed where any vibration is applied to an HDD. To cope with this, in a conventional HDD, a countermeasure has been taken in which the off-track amount is checked at the time of data write operation and, in the case where the off-track amount exceeds a predetermined threshold, an off-track error is determined to occur to thereby cancel the write operation, which is resumed after the vibration has ceased.

Figure 21:
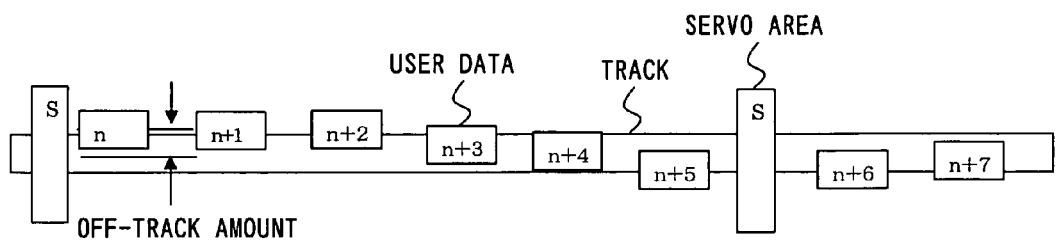
FIG. 21 is a view showing an example of the position of the user data in the case where an off-track error is detected.

FIG. 21 is a view showing an example of the position of the user data in the case where the off-track error is detected. This illustration shows the position of a servo area on the disk medium 15, the position of a track, and the positions of the user data n to n+7 of respective sectors which are written on the track. As can be seen from this illustration, data of respective sectors are disposed between the servo areas and are written with their positions varied with respect to the target track. In an environment where there is a vibration, the off-track amount corresponding to this variation size is increased. Writing operation is inhibited when the off-track amount exceeds a predetermined threshold, thereby preventing the data on a track adjacent to the current target track from being deleted. After this step, a write retry is performed so as to write data as nearly in the center of the track as possible.

The HDD performs the off-track check to read out the position information that has previously been written in the servo area and check the off-track amount which indicates the displacement of the head from the track even in the middle of the data write operation. As described above, when the off track amount exceeds the threshold value during the data write operation, an off-track error is determined to occur to thereby cancel the write operation. However, it takes time to calculate the off-track amount and detect abnormality in the off-track amount, so that there may be cases where the off-track amount abnormality is not detected until the data write operation for the disk medium 15 has been completed. Therefore, a write retry is performed by going back more than several sectors from a time point at which the abnormality has been detected. The HDD performs the write retry in this manner so as to write data as nearly in the center of the track as possible.

However, in the case where the off-track at the write retry appears in the opposite direction to the off-track direction at the previous write operation, there may exist two data that have been written by the previous write operation and write retry. In this case, both data may be read out at a time. The threshold value of the off-track amount is determined so as not to allow two data to exist within one sector as much as possible. However, in recent years, the track width becomes narrower, so that when the data is written with a large off-track amount close to the off-track error, there remains a possibility that two data exist in one sector.

Figure 22:
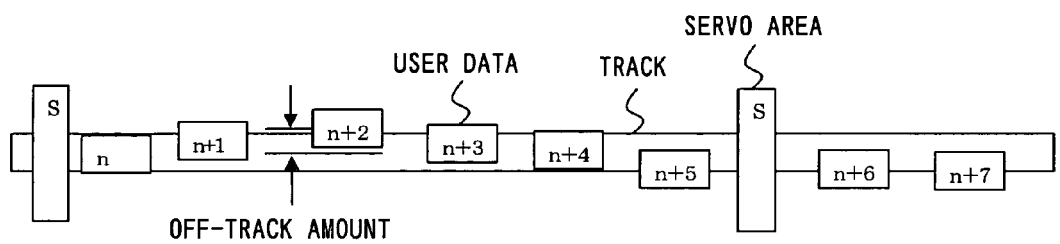
FIG. 22 is a view showing an example of the position of the user data in the case where the off-track error is not detected.

Further, when the off-track amount detected in the servo area does not reach the threshold value, the off-track error is not detected even if the off-track amount at a sector away from the servo area exceeds the threshold value. FIG. 22 is a view showing an example of the position of the user data in the case where the off-track error is not detected. In this illustration, the sector whose off-track amount has exceeded the threshold value is away from the servo area.

Figure 23:
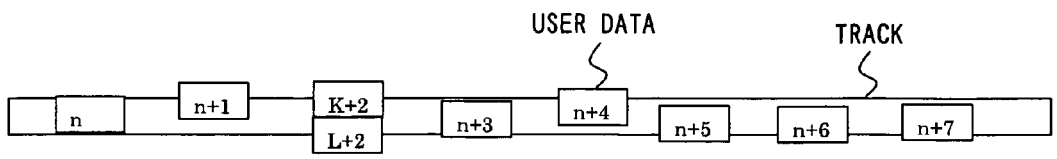
FIG. 23 is a view showing an example of a case in which two user data exist in one sector.

There can also be considered a case where an additional data write operation is performed for a given sector with an off-track in the opposite direction to the off-track direction at the previous write operation performed for the same sector. FIG. 23 is a view showing an example of a case in which two user data exist in one sector. This illustration shows the position of the track and the positions of the user data of respective sectors which are written on the track. Further, in this illustration, user data K+2 and user data L+2 have the same LBA address. Accordingly, in general, a read error occurs in this sector. In this case, however, when a read retry is performed with an offset with respect to the data position, the data in this sector can be read. Further, when the direction of the offset provided in this read retry is changed, different data can be read.

A configuration of an HDD according to the present embodiment will next be described.

Figure 24:
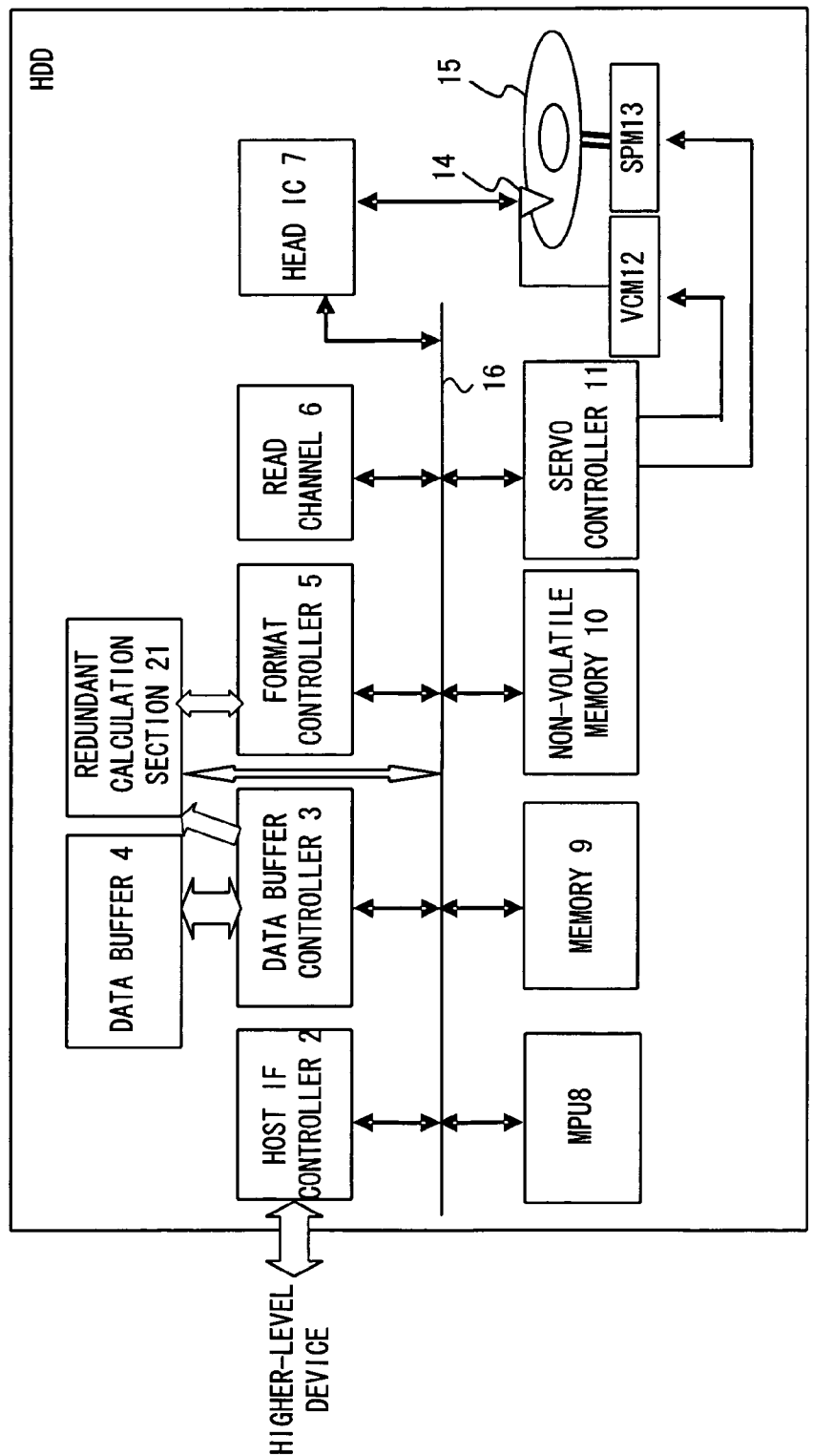
FIG. 24 is a block diagram showing an example of a configuration of the HDD according to a tenth embodiment.

FIG. 24 is a block diagram showing an example of a configuration of the HDD according to the present embodiment. In FIG. 24, the same reference numerals denote the same or corresponding parts as in FIG. 1, and the descriptions thereof are omitted here. A different point from FIG. 1 is that a path from the redundant calculation section 21 to format controller 5 and path from the buffer controller 3 to redundant calculation section 21 are newly provided.

Operation of the HDD according to the present embodiment will next be described.

Write processing of writing the user data and redundant sector data will first be described.

Figure 25:
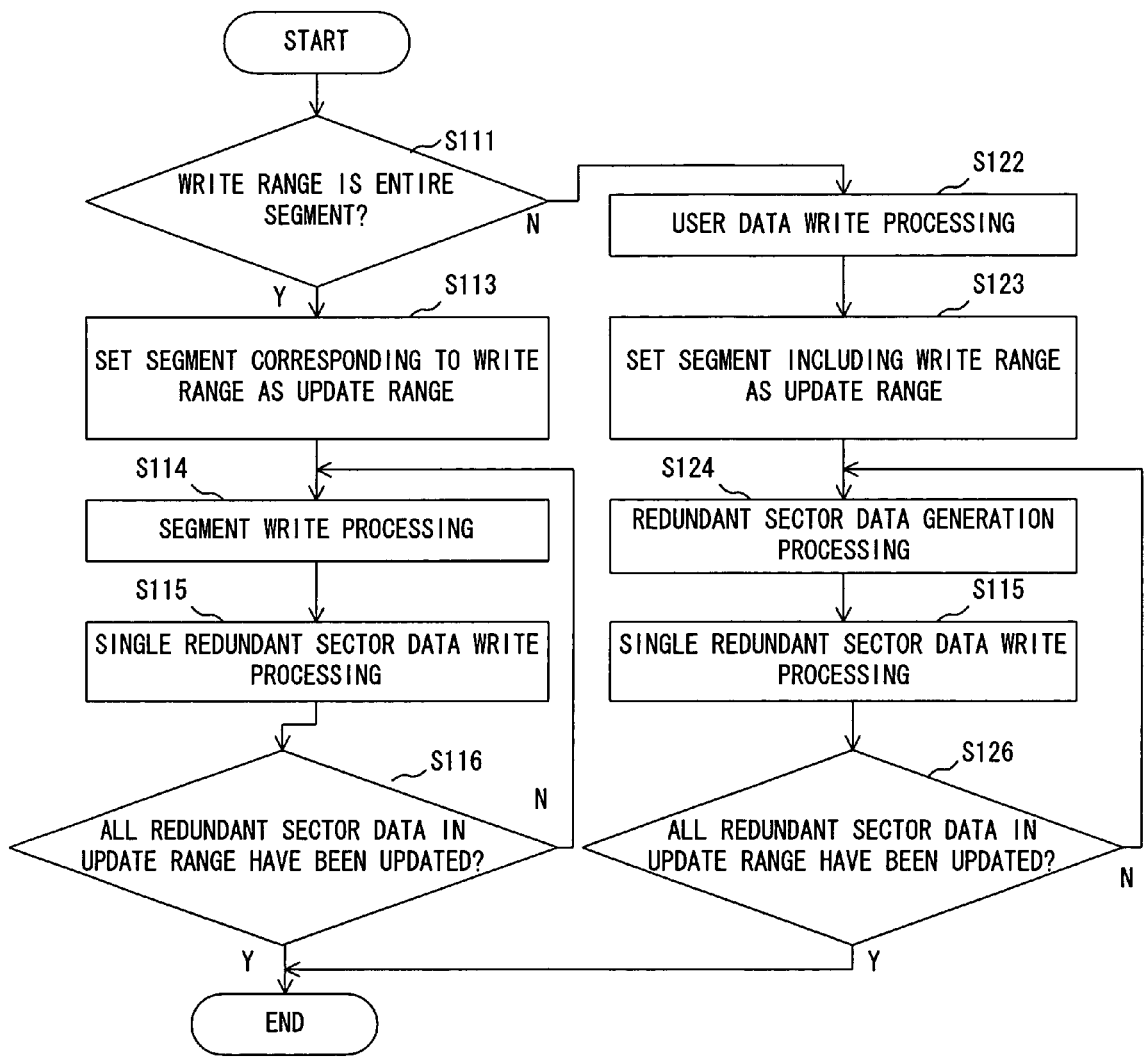
FIG. 25 is a flowchart showing an example of operation of write processing according to the tenth embodiment.

In the present embodiment, unlike the first embodiment in which update of the redundant sector data is performed independently of user write operation, the redundant sector data is updated along with the user data write operation. When receiving a user data write instruction from the higher-level device, the HDD starts the write processing. FIG. 25 is a flowchart showing an example of operation of the write processing according to the present embodiment. The MPU 8 determines whether the write range specified by the user data write instruction is a part of a segment or the entire segment (S111), while if the range is determined to be a part of the segment (N in S111), the MPU 8 advances to step S122.

If the write range is determined to be the entire segment (Y in S111), the MPU 8 sets the segment corresponding to the write range as an update range (S113) performs segment write processing (S114), and performs the same single redundant sector data write processing as that of the first embodiment (S115). After that, the MPU 8 determines whether all redundant sector data in the update range have been updated. If all the redundant sector data have not been updated (N in S116), the MPU 8 returns to step S114, while if all the redundant sector data have been updated (Y in S116), the MPU 8 ends this flow.

If the write range is determined to be a part of the segment (N in S11), the MPU 8 performs user data write processing to write normal user data (S122), sets the segment including the write range as an update range (S123), performs the same redundant sector data generation processing as that of the first embodiment (S124), and performs the same single redundant sector data write processing as that of the first embodiment (S125). After that, the MPU 8 determines whether all redundant sector data in the update range have been updated. If all the redundant sector data have not been updated (N in S126), the MPU 8 returns to step S124, while if all the redundant sector data have been updated (Y in S126), the MPU 8 ends this flow.

The segment write processing in step S114 will next be described.

Figure 26:
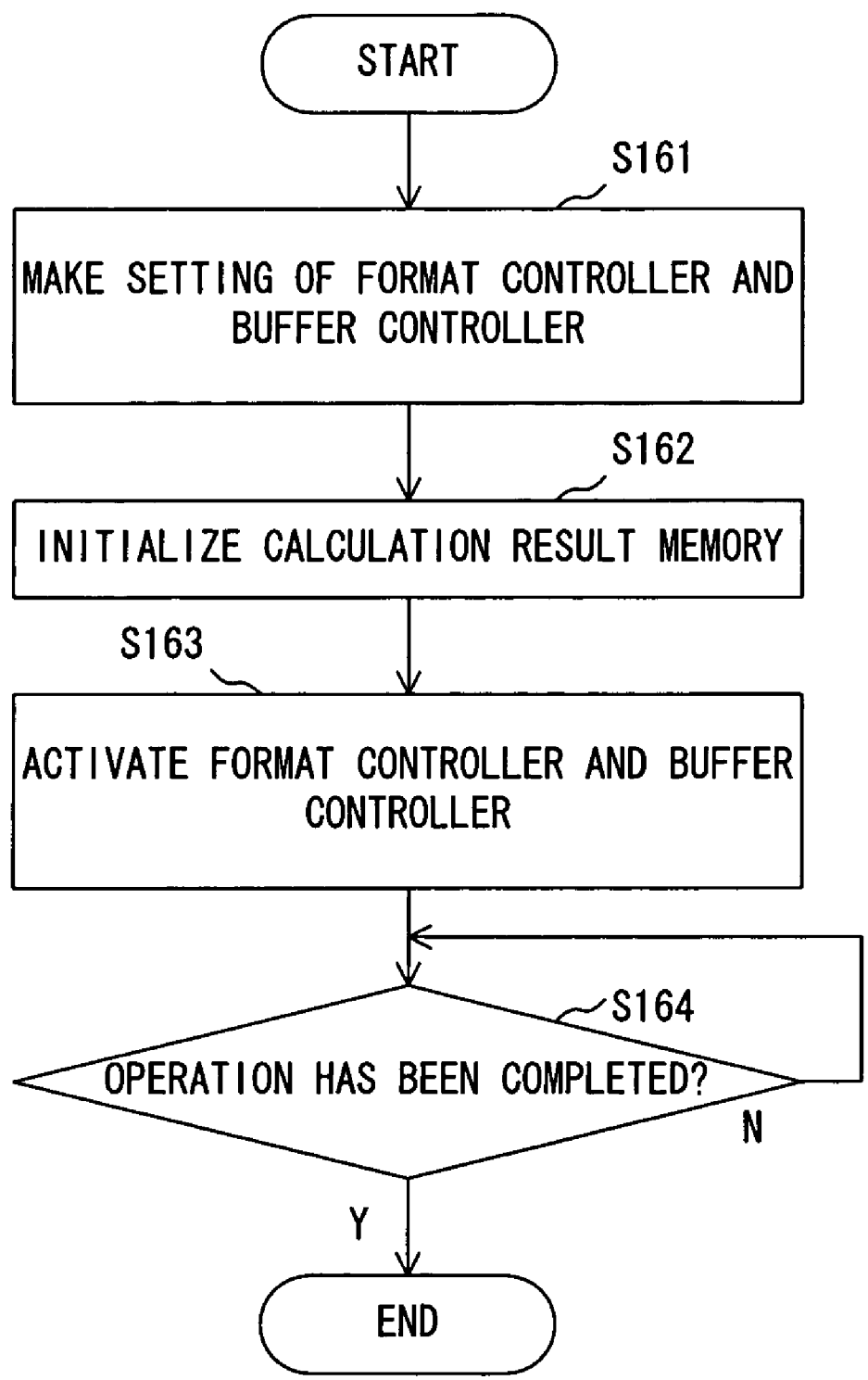
FIG. 26 is a flowchart showing an example of the segment write processing according to the tenth embodiment.

The segment write processing is processing that writes data of the segment corresponding to the write range onto the disk medium 15 and generates redundant sector data corresponding to the segment. FIG. 26 is a flowchart showing an example of the segment write processing according to the present embodiment. The MPU 8 makes the setting of the format controller 5 and data buffer controller 3 so that user data which has been stored in the data buffer 4 for the write processing is written onto the disk medium 15 through the format controller 5 and, at the same time is input to the redundant calculation section 21 through the data buffer controller 3 (S161). Then, the MPU 8 initializes the calculation result memory 31 (S162) and activates the format controller 5 and buffer controller 3 (S163). After that, the format controller 5 sequentially writes user data of respective sectors onto the disk medium 15, and buffer controller 3 sequentially inputs the user data of respective sectors to the redundant calculation section 21.

The MPU 8 then determines whether the user data write operation has been completed. If the write operation has not been completed (N in S164), the MPU 8 returns to step S164, while if the write operation has been completed (Y in S164), the MPU 8 ends this flow. At the time point at which this flow has been ended, the calculation result data in the calculation result memory 31 becomes the redundant sector data of the corresponding segment.

The read retry processing in the case where a retry is performed in user data read processing will next be described.

Figure 27:
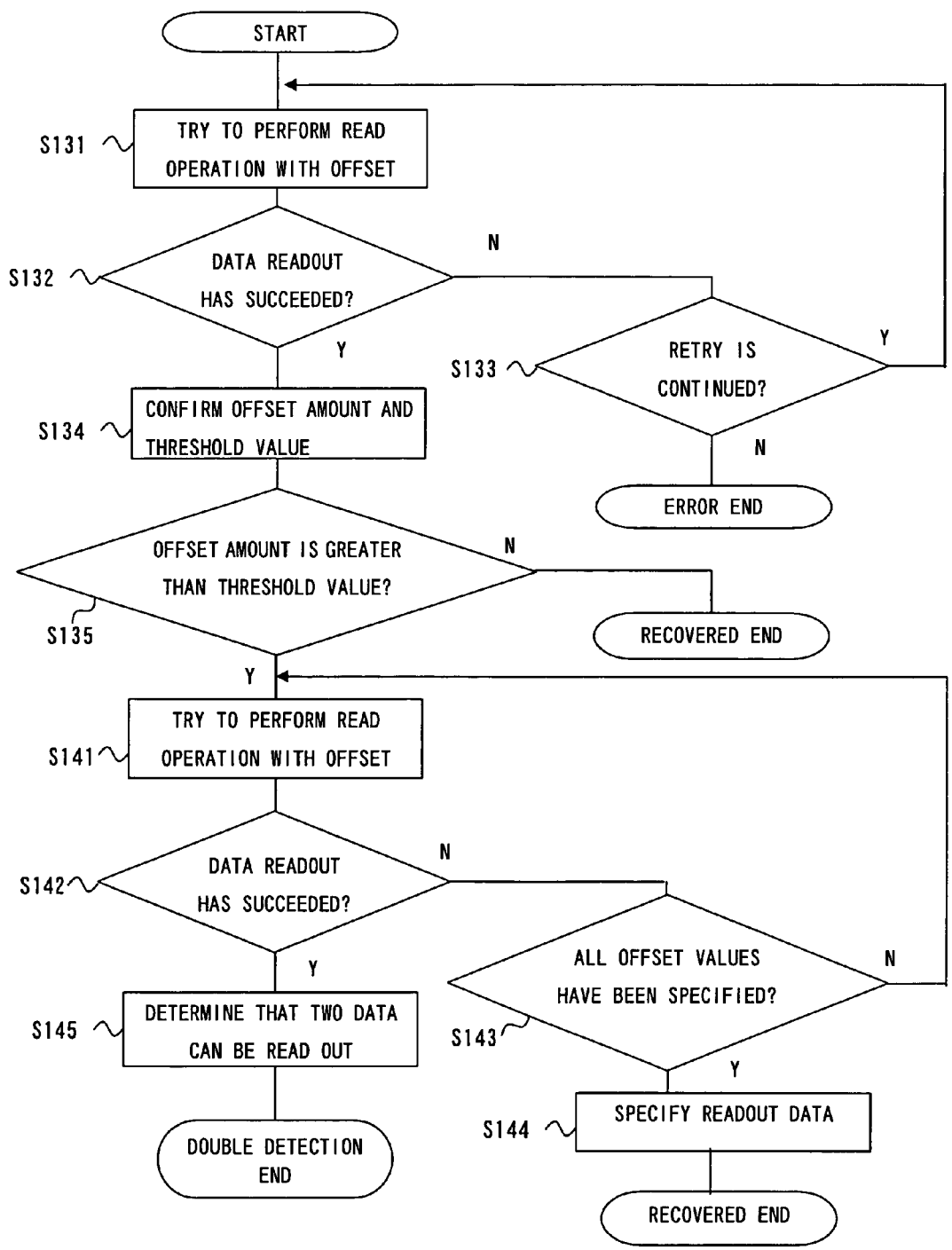
FIG. 27 is a flowchart showing an example of operation of read retry processing according to the tenth embodiment.

FIG. 27 is a flowchart showing an example of operation of the read retry processing according to the present embodiment. The MPU 8 tries to perform read operation with an offset with respect to the data position (S131) and determines whether the data readout has succeeded (S132). The MPU 8 changes the offset amount to be provided in accordance with the number of retry that indicates how many times the read retry was executed.

If the data readout has failed (N in S132), the MPU 8 determines whether the retry is continued or not. If the retry is continued (Y in S133), the MPU 8 returns to step S131, while if the retry is not continued (N in S133), the MPU 8 sets the processing result as an error output and ends this flow.

If the read retry has succeeded Y in S132), the MPU 8 confirms the offset amount provided in step S131 and threshold value of the offset amount (S134) to determine whether the offset amount is greater than the threshold value. If the offset amount is not greater than the threshold value (N in S135), the MPU 8 sets the processing result as "recovered"

and ends this flow. If the offset amount is greater than the threshold value (Y in S135), the MPU 8 advances to the next step.

The MPU 8 then tries to perform read operation with an offset in the opposite direction to that in step S131 (S141) and determines whether the data readout has succeeded (S142). The MPU 8 changes the offset amount in accordance with the number of retry as in the case of step S131.

If the read retry has failed (N in S142), the MPU 8 determines whether all prepared offset values have been specified. If all prepared offset values have not been specified (N in S143), the MPU 8 returns to step S141, while if all prepared offset values have been specified (Y in S143), the MPU 8 specifies data that has been read out in step S131 as the readout data (S144), sets the processing result as "recovered", and ends this flow.

If the read retry has succeeded Y in S142), the MPU 8 determines that two data can be read out (S145) to set the processing result as "double detection", and ends this flow.

Data selection processing performed in the case where the read retry processing result is "double detection" will next be described.

Figure 28:
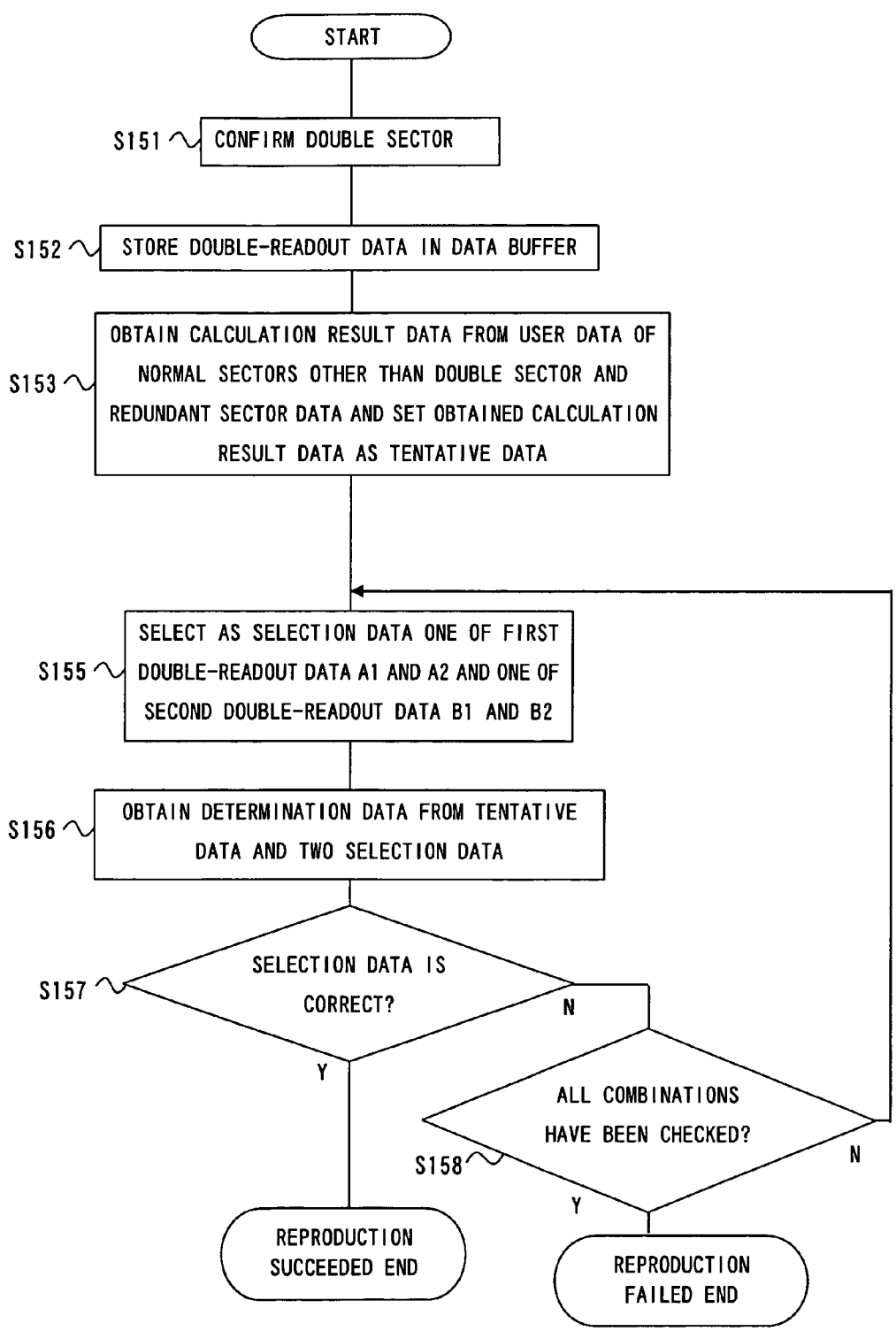
FIG. 28 is a flowchart showing an example of operation of data selection processing according to the tenth embodiment.

Here, the data selection processing in the case where there are two sectors from each of which two data can be read out in a given segment will be described. FIG. 28 is a flowchart showing an example of operation of the data selection processing according to the present embodiment. The MPU 8 identifies the double sectors which are normal sectors each of which two data can be read out (S151) and stores double-readout data which are user data that have been read out from the double sectors in the data buffer 4 (S152). The double-readout data that have been read out from a first double sector are labeled as A1 and A2, and double-readout data that have been read out from a second double sector are labeled as B1 and B2. Then, the MPU 8 initializes the calculation result memory 31 and, in the segment including the double sectors, inputs user data that have been read out from normal sectors other than the double sectors and redundant sector data corresponding to the segment to the redundant calculation section 21 to obtain calculation result data which is set as tentative data (S153).

After determining a combination of the first and second double-readout data that has not been selected, the MPU 8 selects one of the first double-readout data A1 and A2 as first selection data and selects one of the second double-readout data B1 and B2 as second selection data (S155). Then, the MPU 8 initializes the calculation result memory 31 and inputs the tentative data and two selection data to the redundant calculation section 21 to obtain calculation result data which is set as determination data (S156).

Then, the MPU 8 determines whether all the determination data become 0, that is, whether the combination of the selection data is correct or not (S157). Note that when all user data and redundant sector data in a given segment are input to the redundant calculation section 21, all the calculation result data become 0. If the user data completely correspond to the redundant sector data (Y in S157), the MPU 8 determines the selection data at that time as correct user data and outputs it to terminate this flow. If the user data do not completely correspond to the redundant sector data (N in S157), the MPU 8 determines whether all combinations of the selection data have been checked or not. If all combinations have been checked (Y in S158), the MPU 8 determines that it is impossible to select correct user data from the double-readout data, sets the processing result as an error output, and ends this flow. If all combinations have not been checked (N in S158), the MPU 8 returns to step S155, where the MPU 8 checks the next combination.

If the correct user data have been output in step S157, the MPU 8 writes the correct user data in the double sectors. In the case where it is likely that two data are written on one sector due to, e.g., continued vibration application, reassignment processing may be performed to replace the double sectors with sectors (reassign area) in which data has never been written.

A concrete example of the data selection processing will next be described.

Figure 29:
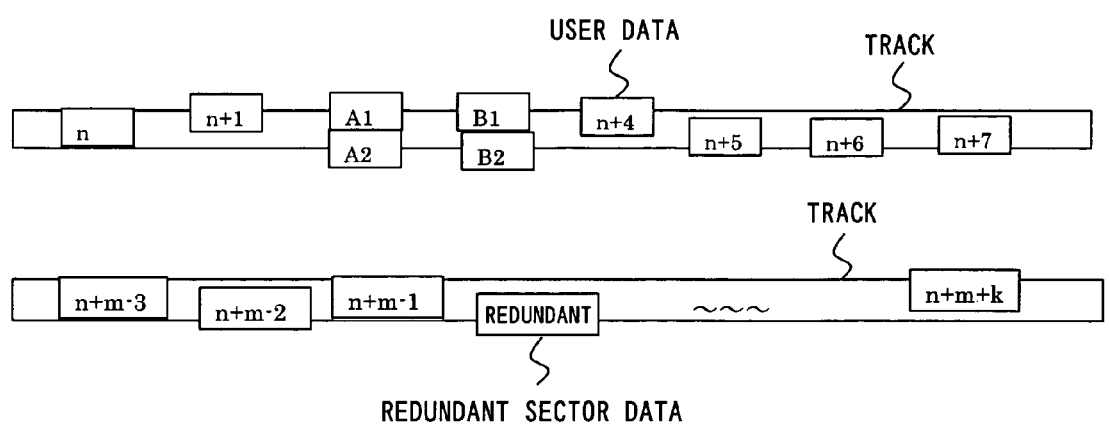
FIG. 29 is a view showing an example of the position of data on the disk medium according to the tenth embodiment.

FIG. 29 is a view showing an example of the position of data on the disk medium according to the present embodiment. This illustration shows the position of the track and the positions of the data of respective sectors which are written on the track on the disk medium 15. In this example, m user data (user data n, n+1, . . . n+m−2, n+m−1) have been written in one segment and, among them, there exists one sector in which two user data A1 and A2 have been written which can be read out in the case where an offset is added. Further, there exists one sector in which two user data B1 and B2 have been written which can be read out in the case where an offset is added. Redundant sector data have been written in a sector following the m user data.

FIG. 30 is data showing an example of a result of the user data readout operation in the data selection processing according to the present embodiment. In this illustration, normal sectors from which user data have been correctly read out are represented by o, and double sectors are represented by x. FIG. 31 is data showing an example of user data choice in the data selection processing according to the present embodiment. Four respective rows denote choices A, B, C, and D of a combination of the first double-readout data and second double-readout data. Normal sectors from which user data have been correctly read out are represented by o, and double sectors are represented by the selection data. The choice A denotes a case where the selection data are A1 and B1, choice B denotes a case where the selection data are A1 and B2, choice C denotes a case where the selection data are A2 and B1, and choice D denotes a case where the selection data are A2 and B2. Data of all sectors of each of the choices A to D and corresponding redundant sector data are input to the redundant calculation section 21, and the choice in which all calculation result data become 0 is output as a correct choice.

In the present embodiment, all the user data that have correctly been read out, all the selection data, and corresponding redundant sector data in a given segment are input to the redundant calculation section 21 to thereby determine whether the combination of the selection data is correct or not. Alternatively, a method may be adopted in which all the user data that have correctly been read out and all the selection data are input to the redundant calculation section 21, and obtained calculation result and redundant sector data are compared to thereby determine whether they correspond to each other.

In the case where the number of the double sectors is other than two, the above data selection processing can be processed in the same manner as the abovementioned processing flow.

Other operations in the HDD according to the present embodiment are the same as those in the HDD according to the first embodiment.

According to the present embodiment, even when a read try succeeds by an offset amount exceeding a predetermined offset amount, it is possible to prevent selection of improper data, thereby increasing the reliability of an HDD.

A first block corresponds to the normal sector in the embodiments. A second block corresponds to the segment in the embodiments. A third block corresponds to the redundant sector in the embodiments. A storage medium corresponds to the disk medium in the embodiments. An update target corresponds to the update range in the embodiments. Calculation data corresponds to the calculation result data in the embodiments. A calculation section corresponds to the redundant calculation section in the embodiments. A write section and a read section correspond to the MPU, data buffer, buffer controller, and format controller in the embodiments. A calculation step corresponds to step S13 in the embodiments. A write step corresponds to step S14 or step S19 in the embodiments.

A read step corresponds to the read retry processing and data selection processing in the embodiments. A duplication block corresponds to the double sector in the embodiments. A write step corresponds to the write processing in the embodiments.

Further, it is possible to provide a program that allows a computer constituting a stored data processing apparatus to execute the above steps as a stored data processing program. By storing the above program in a computer-readable storage medium, it is possible to allow the computer constituting the stored data processing apparatus to execute the program. The computer-readable medium mentioned here includes: an internal storage device mounted in a computer, such as ROM (Read Only Memory) or RAM (Random Access Memory), a portable storage medium such as a CD (Compact Disk)-ROM, a flexible disk, a DVD (Digital Versatile Disk) disk, a magneto-optical disk, or an IC (Integrated Circuit) card; a database that holds computer program; another computer and database thereof; and a transmission medium on a network line.

The MPU 8 and redundant calculation section 21 according to the present embodiments can easily be applied to a storage apparatus to increase the performance of the storage apparatus. Examples of the storage apparatus include a magnetic disk apparatus, an optical disk apparatus, a magneto-optical disk apparatus.

What is claimed is:

1. A data storage apparatus that performs at least write processing for a storage medium on which data is allocated in units of a first block having a predetermined data length, the first block being allocated in units of a second block constituted by a plurality of first blocks, and a third block having the predetermined data length being allocated in correspondence with the second block, comprising:

a calculation section that performs calculation for each bit position using data of all first blocks in an update target on the storage medium, the update target being a second block specified, and outputs a result of the calculation as calculation data;

a write section that writes the calculation data output from the calculation section in a fourth block on the storage medium, the fourth block being a third block corresponding to the update target; and a read section that reads out data from a read target on the storage medium and, in the case where it is determined that a plurality of data can be read out from the read target, sets the read target as a duplication block, reads out data from first blocks on the storage medium other than the duplication block which belong to a second block including the read target so as to set the read out data as determination data, reads out data from a fifth block on the storage medium so as to set the read out data as redundant data, sets one of the plurality of data that can be read out from the duplication block as selection data, and determines whether the selection data is correct data using the determination data, redundant data, and selection data, the read target being a first block specified, the fifth block being a third block corresponding to the read target, wherein the calculation section initializes the calculation data, sequentially sets the respective first blocks in the update target as input data of the calculation, performs calculation for each bit position using the input data and calculation data, stores a result of the calculation as new calculation data, and repeats the calculation and storage for all the input data to output the calculation data.

2. The data storage apparatus according to claim 1, wherein the read section further reads out data from the first block specified as a read target and, in the case where the data read from the read target has failed, sets the first block as an error block, reads out normal data which are all data in the read target other than the error block which belong to a second block including the read target, and reads out redundant data in a third block corresponding to the second block.

3. The data storage apparatus according to claim 2, wherein the calculation section further initializes the calculation data, sequentially sets the respective normal data and the respective redundant data as input data of the calculation, performs calculation for each bit position using the input data and calculation data, stores a result of the calculation as new calculation data, and repeats the calculation and storage for all the input data to output the calculation data.

4. The data storage apparatus according to claim 1, wherein the read section sequentially selects one data from a plurality of data which can be read out from the duplication block as the selection data.

5. The data storage apparatus according to claim 1, wherein when receiving a data write instruction from an external device and in the case where a write target specified by the data write instruction is a certain entire second block, the calculation section sets the write target as the update target, performs calculation for each bit position using all data of the first block in the update target included in the data write instruction, and outputs a result of the calculation as calculation data.

6. The data storage apparatus according to claim 1, wherein, when receiving a data write instruction from an external device and in the case where the write target specified by the data write instruction is a part of a certain second block, the calculation section sets the write target as the update target after data write based on the data write instruction, reads out all first blocks in the update target, performs calculation for each bit position using all first blocks in the update target, and outputs a result of the calculation as calculation data.

7. The data storage apparatus according to claim 1, wherein, when receiving a data read instruction from an external device, the read section specifies a target of the data read instruction as the read target and, in the case where it is determined that the selection data is correct data, outputs the normal data and selection data to the external device.

8. The data storage apparatus according to claim 1, wherein, in the case where it is determined that the selection data is correct data, the read section further performs write operation of the selection data in the read target.

9. The data storage apparatus according to claim 1, wherein,
in the case where it is determined that the selection data is correct data, the read section further performs reassignment processing for the read target.

10. A data storage apparatus that performs at least write processing for a storage medium on which data is allocated in units of a first block having a predetermined data length, the first block being allocated in units of a second block constituted by a plurality of first blocks, and a third block having the predetermined data length being allocated in correspondence with the second block, comprising:
a calculation section that performs calculation for each bit position using data of all first blocks in an update target on the storage medium, the update target being a second block specified, and outputs a result of the calculation as calculation data;
a write section that writes the calculation data output from the calculation section in a fourth block on the storage medium, the fourth block being a third block corresponding to the update target; and
a read section that reads out data from a read target on the storage medium and, in the case where it is determined that a plurality of data can be read out from the read target, sets the read target as a duplication block, reads out data from first blocks on the storage medium other than the duplication block which belong to a second block including the read target so as to set the read out data as determination data, reads out data from a fifth block on the storage medium so as to set the read out data as redundant data, sets one of the plurality of data that can be read out from the duplication block as selection data, and determines whether the selection data is correct data using the determination data, redundant data, and selection data, the read target being a first block specified, the fifth block being a third block corresponding to the read target, wherein
the calculation section further performs calculation for each bit position using the determination data, the redundant data, and the selection data and sets a result of the calculation as calculation data, and
in the case where the calculation data is a predetermined value, the read section determines that the selection data is correct data.

11. The data storage apparatus according to claim 10, wherein
the calculation section initializes the calculation data, sequentially sets the respective determination data, the respective redundant data, and the respective selection data as input data of the calculation, performs calculation for each bit position using the input data and calculation data, stores a result of the calculation as new calculation data, and repeats the calculation and storage for all the input data to output the calculation data.

12. A data storage apparatus that performs at least write processing for a storage medium on which data is allocated in units of a first block having a predetermined data length, the first block being allocated in units of a second block constituted by a plurality of first blocks, and a third block having the predetermined data length being allocated in correspondence with the second block, comprising:
a calculation section that performs calculation for each bit position using data of all first blocks in an update target on the storage medium, the update target being a second block specified, and outputs a result of the calculation as calculation data;
a write section that writes the calculation data output from the calculation section in a fourth block on the storage medium, the fourth block being a third block corresponding to the update target; and
a read section that reads out data from a read target on the storage medium and, in the case where it is determined that a plurality of data can be read out from the read target, sets the read target as a duplication block, reads out data from first blocks on the storage medium other than the duplication block which belong to a second block including the read target so as to set the read out data as determination data, reads out data from a fifth block on the storage medium so as to set the read out data as redundant data, sets one of the plurality of data that can be read out from the duplication block as selection data, and determines whether the selection data is correct data using the determination data, redundant data, and selection data, the read target being a first block specified, the fifth block being a third block corresponding to the read target, wherein
the read section performs read operation of a read target by adding a first offset which is a predetermined offset value to the position of a head and, in the case where the read operation has succeeded and the first offset amount is greater than a predetermined offset in the opposite direction to the first offset.

13. The data storage apparatus according to claim 12, wherein,
in the case where the read operation performed by adding the second offset has succeeded, it is determined that a plurality of data can be read out from the read target.

* * * * *

UNITED STATES PATENT AND TRADEMARK OFFICE
CERTIFICATE OF CORRECTION

PATENT NO. : 7,702,954 B2 Page 1 of 1
APPLICATION NO. : 11/651829
DATED : April 20, 2010
INVENTOR(S) : Yoshida It is certified that error appears in the above-identified patent and that said Letters Patent is hereby corrected as shown below:

In the Claims:

Claim 12, Col. 26, Line 43   After "predetermined offset" insert --amount threshold value, performs read operation by adding a second offset which is an offset--.

Signed and Sealed this

Seventh Day of September, 2010

David J. Kappos
*Director of the United States Patent and Trademark Office*